United States Patent [19]
Hayashi et al.

[11] Patent Number: 5,686,012
[45] Date of Patent: Nov. 11, 1997

[54] MODIFIED PARTICLES

[75] Inventors: Kazuyuki Hayashi; Hiroko Morii; Mineko Sakoda; Minoru Ohsugi, all of Hiroshima; Mamoru Kamigaki, Kure, all of Japan

[73] Assignee: Toda Kogyo Corporation, Japan

[21] Appl. No.: 522,723

[22] Filed: Sep. 1, 1995

[30] Foreign Application Priority Data

Sep. 1, 1994 [JP] Japan ................................. 6-232177

[51] Int. Cl.$^6$ .............................. C09C 3/12; C09D 7/12; G11B 5/74; H01F 1/00
[52] U.S. Cl. ................. 252/62.56; 252/62.54; 252/62.51 R; 428/403; 428/407; 428/692; 106/490
[58] Field of Search .............. 252/62.54, 62.51 R, 252/62.56; 428/403, 407, 692; 106/490

[56] References Cited

U.S. PATENT DOCUMENTS

| | | | |
|---|---|---|---|
| 3,849,152 | 11/1974 | Mimeault | 106/454 |
| 4,369,265 | 1/1983 | Buxbaum et al. | 428/403 |
| 4,544,415 | 10/1985 | Franz et al. | 106/431 |
| 5,232,782 | 8/1993 | Charmot | 252/62.54 |
| 5,387,467 | 2/1995 | Höhner et al. | 428/391 |

FOREIGN PATENT DOCUMENTS 42 07 832 C1  3/1992  Germany.

OTHER PUBLICATIONS

Derwent Database WPI Week 8710 AN 87-070535 XP001017549 & JP-A-62 025 753—Feb. 1987.
Derwent Database WPI Week 9116 AN 91-112885 XP002017550 & JP-A-03 053 261 Mar. 1991.
Derwent Database WPI Week 9051 AN 90-380378 XP002017551 & JP-A-02 275 814 Nov. 1990.
Derwent Database WOU Week 9440 AN 94-322377 XP002017552 & JP-A-06 248 217 Sep. 1994.

*Primary Examiner*—Melissa Bonner
*Attorney, Agent, or Firm*—Nixon & Vanderhye

[57] ABSTRACT

The disclosure describes modified particles comprising inorganic particles as core particles, and at least one polysiloxane modified with at least one selected from the group consisting of polyethers, polyesters and aralkyls, which is coated on the surfaces of said core particles.

46 Claims, No Drawings

MODIFIED PARTICLES

BACKGROUND OF THE INVENTION

The present invention relates to modified particles. More particular, it relates to modified particles which show excellent dispersing properties, namely excellent dispersion facility, dispersion homogeneity and dispersion stability, in constituting materials of water-based paints, a process for producing such modified particles, a water-based paint containing said modified particles, and a magnetic recording sheet obtained by coating on water-based paint containing the modified particles as magnetic particles.

Inorganic colored particles such as iron oxide particles and ferric oxide hydroxide particles have been popularly used as a pigment by dispersing the inorganic colored particles in a vehicle as these particles are stable in the air because of being an oxide and also have various colors depending on the difference of their crystal structure, presence or absence of crystal water and other factors.

There has been ever rising requests in recent years for higher performance and quality of the coating films formed on various substrates with paints. For meeting these requests, there has been required an improvement of the properties of the pigment which is considered the most influential factor on the qualities of the coating films such as clearness of color tone, tinting strength, hiding power (obliterating power) and gloss. In other words, it is essential that the pigment used in the paint has excellent dispersing properties, especially excellent dispersion facility, dispersion homogeneity and dispersion stability in the paint vehicle.

This fact is pointed out, for instance, in "The Latest Techniques for Pigment Dispersion", published by the Technical Information Society in 1993, which states on page 15: "Pigment is never used singly and it is always used after dispersed in a binder resin, solvent or other suitable material. The fine pigment particles need to be easily dispersible and also homogeneously dispersed in the binder for obtaining a clear color tone, high tinting strength and other desired performance. However, since finer particles have less stability, it is a matter of great account to maintain stable dispersibility of the pigment particles.", and "The properties required for the pigment may be defined and classified as follows from the various viewpoints. . . . Dispersibility is classified as a matter that affects the physical properties, but it also has close relation to and influences the optical, chemical and specific functional properties. That is, the improvement of dispersibility of the pigment for allowing uniform dispersion not only means enhancement of clearness of color tone, tinting strength, hiding power and gloss of the coating film, but also leads to improvement of chemical properties such as fastness and workability. . . . "

Also, magnetic recording sheets are used expandingly, for the purpose of labor saving and improvement of working efficiency. Such magnetic recording sheets are practically used, for example, for magnetic railway tickets, commutation-tickets, express highway passes, credit cards, ID (identity) cards, telephone cards, orange cards, etc.

These magnetic recording sheets are generally of a structure comprising a non-magnetic support made of a plastic material such as polyvinyl chloride or paper, and stripe-like of magnetic layer formed on one side of the said support by applying thereon a magnetic coating having magnetic particles dispersed in its vehicle, or a magnetic layer being formed over the entirety of one side of the said support, while an image(s) or mark(s) such as picture(s), character(s), letter(s), etc., being printed on the other side of the support.

Paints or coating compositions are divided into two types depending on the solvent used: solvent-type paints using an organic solvent as main solvent and water-based paints using water as main solvent. Water-based paints are favored in terms of safety, hygiene and environmental protection as water-based paints have no serious atmospheric pollution problem, are more advantageous in saving of resources and energy, and also have little risk of causing a fire.

However, since the dispersion mechanism of the particles in a water-based paint is different from that in the conventional solvent-type paints, it is impossible to disperse the particles in a vehicle by the same dispersion techniques as used for the solvent-type paints. An aqueous resin (color developer) is used in a water-based paint. A solvent-type resin (color developer) exists in a dissolved state with a certain spread, but an aqueous resin exists mostly in the form of particles such as emulsion polymer particles or colloidal particles. Consequently it becomes a problem how it should be dispersed the particles in the vehicle and how long it should take until effected, that is, dispersion facility and dispersion homogeneity of particles such as magnetic particles, pigment particles or the like, becomes the problem of primary consideration. Then dispersion stability comes into question since the particles tend to reagglomerate due to less extension of aqueous resin. This problem of dispersibility is serious especially in case the particles dispersed in a water-based paint have magnetization because, in this case, there takes place magnetic agglomeration of the particles.

For example, imperfect dispersion of magnetic particles in a water-based paint is causative of poor smoothness of the magnetic coating surface or deterioration of magnetic properties such as squareness, resulting in serious troubles such as variation of output and dropout of the produced magnetic recording sheet.

It has been thus strongly required to provide particles such as magnetic particles, pigment particles or the like which are excellent in dispersion facility, dispersion homogeneity and dispersion stability by improving the dispersibility of the particles in a water-based paint.

For improving dispersibility of inorganic particles in vehicle, it has been propose to coat inorganic particle surfaces with various kinds of inorganic or organic compounds. For example, coating of the inorganic particle surfaces with organopolysiloxanes (Japanese Patent Publication (KOKOKU) Nos. 56-43264, 57-2641, 58-13099, 60-3430, 1-54379 and 5-4129, Japanese Patent Application Laid-Open (KOKAI) Nos. 57-67681, 59-15455, 61-127767, 62-87237, 63-113082, 63-168346, 63-202671, 1-182368, 2-212561, 3-163172, 4-68041, 5-111631, 5-214264, 5-339518, etc.), coating of the inorganic particle surfaces with organic silicon compounds (Japanese Patent Application Laid-Open (KOKAI) Nos. 50-44498, 51-40903, 57-200306, 62-87237, 4-170323, etc.) and coating of the inorganic particle surfaces with a silane coupling agent (Japanese Patent Application (Laid-open) Nos. 49-59608, 51-13489, 52-44794, 54-7310, 54-110999, 55-94968, 60-240769, 4-18930, 4-78433, 5-239446, etc.) have been proposed.

In Japanese Patent Application (Laid-open) No. 62-187772, the addition of a polyester-containing polysiloxane having effects of reducing tackiness and bettering lubricity, into the coating composition, and a lacquer or molding composition comprising a resin component and an effective anti-adhesive properties producing and lubricity increasing amount of a polyester-containing polysiloxane mixed with the resin component are described.

Thus, the conventional particles having their surfaces coated with organopolysiloxanes, organic silicon compounds or silane coupling agents mentioned above are unsatisfactory in dispersion facility, dispersion homogeneity and dispersion stability in vehicle as shown in the Comparative Examples described later.

Also, the lacquer or molding composition containing a polyester-containing polysiloxane described in Japanese KOKAI No. 62-187772 falls short of providing the desired improvements of dispersing properties such as dispersion facility, dispersion homogeneity and dispersion stability, of the particles in vehicle as shown in a Comparative Example described later.

It is more strongly required at present to provide particles which are improved in particle dispersibility in a water-based paint, i.e., are excellent in dispersion facility, dispersion homogeneity and high dispersion stability. However, no such particles are yet available.

The technical subject of the present invention is to provide the modified particles improved in dispersibility of the particles in water-based paints, which are easy to disperse, can be dispersed homogeneously and have excellent dispersion stability.

As a result of the present inventors' earnest studies, it has been found that by mixing inorganic particles such as inorganic colored particles and magnetic particles with a polysiloxane modified by a compound selected from the group consisting of polyethers, polyesters and aralkyls, the thus obtained modified particles comprising the inorganic particles having their surfaces coated with a polyethers-, polyesters- and aralkyls-modified polysiloxane, have excellent dispersibility and dispersion stability in the base composition of water-based paints. The present invention has been attained on the basis of this finding.

SUMMARY OF THE INVENTION

An object of the present invention is to provide modified particles having excellent dispersion facility (easy dispersibility), dispersion homogeneity (homogeneous dispersibility) and dispersion stability in vehicles, and a process for industrial production of such modified particles.

To accomplish the aim, in a first aspect of the present invention, there are provided modified particles comprising inorganic particles as core particles, and at least one polysiloxane modified with at least one selected from the group consisting of polyethers, polyesters and aralkyls, which is coated on the surfaces of the core particles.

In a second aspect of the present invention, there is provided modified particles comprising inorganic colored particles as core particles, and at least one polysiloxane modified with at least one selected from the group consisting of polyethers, polyesters and aralkyls, which is coated on the surfaces of the core particles.

In a third aspect of the present invention, there is provided modified particles comprising magnetic particles as core particles, and at least one polysiloxane modified with at least one selected from the group consisting of polyethers, polyesters and aralkyls, which is coated on the surfaces of the core particles.

In a fourth aspect of the present invention, there is provided modified particles comprising inorganic particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In a fifth aspect of the present invention, there is provided modified particles comprising inorganic colored particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In a sixth aspect of the present invention, there is provided modified particles comprising magnetic particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In a seventh aspect of the present invention, there is provided a pigment comprising modified particles comprising inorganic colored particles as core particles, and at least one polysiloxane modified with at least one selected from the group consisting of polyethers, polyesters and aralkyls, which is coated on the surfaces of the core particles.

In an eighth aspect of the present invention, there is provided a pigment comprising modified particles comprising inorganic colored particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In a ninth aspect of the present invention, there is provided a water-based paint comprising a paint base material and a pigment comprising modified particles comprising inorganic colored particles as core particles, and at least one polysiloxane modified with at least one selected from the group consisting of polyethers, polyesters and aralkyls, which is coated on the surfaces of the core particles.

In a tenth aspect of the present invention, there is provided a water-based paint comprising a paint base material and a pigment comprising modified particles comprising inorganic colored particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In an eleventh aspect of the present invention, there is provided a magnetic water-based paint comprising a paint base material and magnetic particles comprising modified particles comprising magnetic particles as core particles, and at least one polysiloxane modified with at least one selected from the group consisting of polyethers, polyesters and aralkyls, which is coated on the surfaces of the core particles.

In a twelfth aspect of the present invention, there is provided a magnetic water-based paint comprising a paint base material and magnetic particles comprising modified particles comprising magnetic particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles.

In a thirteenth aspect of the present invention, there is provided a magnetic recording sheet comprising a nonmagnetic support and a magnetic layer formed by applying a magnetic water-based paint comprising a paint base material and magnetic particles comprising modified particles comprising magnetic particles as core particles, and at least one polysiloxane modified with at least one selected from the group consisting of polyethers, polyesters and aralkyls, which is coated on the surfaces of the core particles, on at least a part of said support and at least one side of said support, the surface roughness of said magnetic layer being not more than 0.35 μm and the squareness of said magnetic layer being not less than 0.87.

In a fourteenth aspect of the present invention, there is provided a magnetic recording sheet comprising a non-magnetic support and a magnetic layer formed by applying a magnetic water-based paint comprising a paint base material and magnetic particles comprising modified particles comprising magnetic particles as core particles, squaric acid which is coated on the surfaces of the core particles, and at least one polysiloxane modified with at least one selected from the group consisting of polyethers, polyesters and aralkyls, which is coated on the squaric acid-coated particle surfaces of the core particles, on at least a part of said support and at least one side of said support, the surface roughness of said magnetic layer being not more than 0.35 μm and the squareness of said magnetic layer being not less than 0.87.

In a fifteenth aspect of the present invention, there is provided a process for producing modified particles, which comprises mixing, at not less than 80° C., inorganic particles and at least one polysiloxane modified with at least one selected from the group consisting of polyethers, polyesters and aralkyls to coat the surfaces of said particles with said modified polysiloxane.

In an sixteenth aspect of the present invention, there is provided a process for producing modified particles, which comprises adding squaric acid to an aqueous suspension containing the inorganic particles, followed by filtering and drying to coat the particle surfaces with squaric acid, and then mixing, at not less than 80° C., said squaric acid-coated inorganic particles and at least one polysiloxane modified with at least one selected from the group consisting of polyethers, polyesters and aralkyls to overlay said squaric acid-coated particle surfaces with said polysiloxane.

DETAILED DESCRIPTION OF THE INVENTION

The inorganic particles usable as core particles in the present invention include inorganic colored particles of various kinds of pigment such as white pigment, black pigment, yellow pigment, orange pigment, brown pigment, red pigment, violet pigment, blue pigment, green pigment, etc., and magnetic particles such as magnetoplumbite-type ferrite particles, magnetic iron oxide particles, etc.

The inorganic colored particles according to the present invention are the particles having high tinting strength and, when kneaded with a color developer, capable of giving a color to a coating film or molded product. Specifically, such particles include white colored particles such as particles of zinc white (ZnO), white lead ($2PbCO_3.Pb(OH)_2$), basic lead sulfate ($3PbSO_4.PbO~2PbSO_4.PbO$), lead sulfate ($PbSO_4$), lithopone ($ZnS+BaSO_4$), zinc sulfate (ZnS), titanium oxide ($TiO_2$) and antimony oxide ($Sb_2O_3$); black colored particles such as particles of carbon black (C), black lead (C) and black iron oxide ($FeOx.Fe_2O_3$ ($0<x\leq1$)); yellow colored particles such as particles of chrome yellow ($PbCrO_4$), zinc yellow ($ZnCrO_4$), barium chromate ($BaCrO_4$), cadmium yellow (CdS), yellow ferric oxide hydroxide ($FeOOH.nH_2O$), loess ($Fe_2O_3.SiO_2.Al_2O_3$), titan yellow ($TiO_2.NiO.Sb_2O_3$), lead cyanamide ($Pb(CN)_2$) and calcium plumbate ($Ca_2PbO_4$); orange colored particles such as particles of chrome orange ($PbCrO_4.PbO$) and chrome vermilion ($PbCrO_4.PbMoO_4.PbSO_4$); brown colored particles such as particles of brown iron oxide ($\gamma$-$Fe_2O_3$) and umber ($Fe_2O_3+MnO_2+Mn_3O_4$); red colored particles such as particles of red iron oxide (hematite, $\alpha$-$Fe_2O_3$), red lead ($Pb_3O_4$), vermilion (HgS), cadmium red (CdS+CdSe), cadmium mercury red (CdS +HgS) and antimony vermilion ($2Sb_2S_3.Sb_2O_3$ or $Sb_2S_3.Sb_2O_3$); violet colored particles such as particles of cobalt violet ($Co_3(PO_4)_2$, $Co_3(PO_4)_2.8H_2O$), cobalt violet ($Co_3(AsO_4)_2$, $Co_3(AsO_4)_2.8H_2O$) and manganese violet ($Mn_2(PO_4)_3$, $(NH_4)_2Mn(P_2O_7)_2$); blue colored particles such as particles of ultramarine ($3NaAl.SiO_4.Na_2S_2$, $2(Na_2O.Al_2O_3.2SiO_2).Na_2S_2$), prussian blue ($Fe_4[Fe(CN)_6]_3.nH_2O$), cobalt blue ($CoO.nAl_2O_3$) and cerulean blue ($CoO.nSnO_2.mMgO$ (n=1.5 to 3.5, m=2 to 6); and green colored particles such as particles of chrome green (prussian blue+chrome yellow), zinc green (zinc yellow+prussian blue), chromium oxide ($Cr_2O_3$), veridiam ($Cr_2O(OH)_4$), emerald green ($Cu(CH_3CO_2)_2.3CuO(AsO_2)_2$) and cobalt green (CoO.ZnO.MgO).

Among them, zinc white (ZnO), white lead ($2PbCO_3.Pb(OH)_2$), titanium oxide ($TiO_2$), antimony oxide ($Sb_2O_3$), black iron oxide ($FeOx.Fe_2O_3$ ($0<x\leq1$)), chrome yellow ($PbCrO_4$), zincyellow ($ZnCrO_4$), cadmium yellow (CdS), yellow iron oxide hydroxide ($FeOOH.nH_2O$), titan yellow ($TiO_2.NiO.Sb_2O_3$), chrome vermilion ($PbCrO_4.PbMoO_4.PbSO_4$), brown iron oxide ($\gamma$-$Fe_2O_3$), red iron oxide ($\alpha$-$Fe_2O_3$), cadmium red (CdS+CdSe), cadmium mercury red (CdS+HgS), cobalt blue ($CoO.nAl_2O_3$), chrome green (prussian blue+chrome yellow), and chromium oxide ($Cr_2O_3$) are preferred. Black iron oxide ($FeOx.Fe_2O_3$ ($0<x\leq1$)), red iron oxide ($\alpha$-$Fe_2O_3$), brown iron oxide ($\gamma$-$Fe_2O_3$), yellow iron oxide hydroxide ($FeOOH.nH_2O$), titanium oxide ($TiO_2$), chrome yellow ($PbCrO_4$), and chromium oxide ($Cr_2O_3$) are more preferred.

The inorganic colored particles according to the present invention don't include particles of extender pigments which are low in tinting strength and become transparent or semi-transparent when kneaded with a vehicle, for example, particles composed of sulfates, silicates, oxides, hydroxides or carbonates of Ba, Ca, Al, Si or Mg.

Magnetoplumbite-type ferrite particles usable as magnetic particles in the present invention include barium ferrite particles, strontium ferrite particles, barium-strontium ferrite particles and particles wherein at least one element such as Co, Ti, Zn, Sn, Al and Ni, is contained in the above-mentioned particles for controlling the magnetic properties. The particle shape is not specified and it may be, for instance, plate-like or irregular, but in view of orientability in the paint, plate-like particles are preferred.

As magnetic iron oxide particles, there can be used magnetite ($FeOx.Fe_2O_3$) particles, maghemite particles, particles wherein the above-mentioned particles are doped with Co, particles wherein the surfaces of the above-mentioned particles are coated or modified with a Co compound, particles at least one element such as Al, Si, Zn, P or Sn is contained in the above-mentioned particles, and particles wherein the surfaces of the above-mentioned particles are coated with a Al, Si, Zn, P and/or Sn compound for improving magnetic properties. The particle shape is not defined and it may be granular, acicular-like, spindle-shaped, plate-like, etc.

The average diameter of the inorganic particles of the present invention is 0.01 to 20 μm.

An aspect of the present invention is explained in detail using as the inorganic colored particles, iron oxide-based particles and iron oxide hydroxide-based particles, and as the magnetic particles magnetoplumbite-type ferrite particles and magnetic iron oxide particles.

In the inorganic colored particles used in the present invention, iron oxide-based particles such as red iron oxide ($\alpha$-Fe$_2$O$_3$) particles, black iron (FeOx.Fe$_2$O$_3$ ($0<x\leq1$)) particles, brown iron oxide ($\gamma$-Fe$_2$O$_3$) particles, etc., and yellow iron oxide hydroxide-based particles such as goethite ($\alpha$-FeOOH) particles, akaganeite ($\beta$-FeOOH) particles, lepidocrocite ($\gamma$-FeOOH) particles, etc., may be of any suitable shape such as granular (cubic, octahedral, spherical, etc.), acicular-like, spindle-shaped, plate-like, etc.

In the case of granular particles, the average particle size (average particle diameter) of the iron oxide-based particles or yellow iron oxide hydroxide-based particles used in the present invention is 0.01 to 10 μm, preferably 0.1 to 0.5 μm in view of tinting strength and hiding power (obliterating power). In the case of acicular-like or spindle-shaped particles, The average major axial diameter thereof is 0.1 to 20 μm, preferably 0.1 to 1.0 μm, and the average aspect ratio (average major axial diameter/average minor axial diameter) thereof is 2/1 to 20/1, preferably 3/1 to 10/1 in view of tinting strength and hiding power. In the case of plate-like particles, the average diameter (plate surface diameter) thereof is 0.01 to 20.0 μm, preferably 0.1 to 10.0 μm, and the average thickness thereof is 0.005 to 2.0 μm, preferably 0.01 to 1.0 μm in view of tinting strength and brilliancy.

As the inorganic colored particles other than the said colored iron oxide-based particles and yellow iron oxide hydroxide-based particles, those commercially available as colored particles are usually used. The particle size is preferably 0.01 to 10 μm, more preferably 0.05 to 1.0 μm, still more preferably 0.1 to 0.5 μm in view of tinting strength.

The average particle size of magnetoplumbite-type ferrite particles used as the magnetic core particles in the present invention is preferably 0.01 to 10.0 μm, more preferably 0.1 to 1.0 μm, and the BET specific surface area thereof is preferably 1.0 to 15 m$^2$/g, more preferably 2.0 to 10 m2/g. The average plate ratio (plate surface area/thickness) of the particles is preferably 1.5/1 to 20/1, more preferably 3/1 to 10/1, and the coercive force Hc thereof is preferably 100 to 6,000 Oe, more preferably 200 to 5,000 Oe. The saturation magnetization σs of the particles is preferably 50 to 65 emu/g, more preferably 55 to 65 emu/g.

When the average particle size is too small, the particles may tend to agglomerate magnetically, impairing dispersion of the particles in vehicle. When the average particle size is too large, the obtained magnetic layer surface may tends to have poor smoothness, which is unfavorable to magnetic recording in terms of spacing loss.

When the BET specific surface area is too small, the particles may become coarse and the produced magnetic layer surface has poor smoothness, which is disadvantageous to magnetic recording. When the BET specific surface area is too large, the particles may be either very fine or porous, so that it is hardly possible to obtain good dispersion of the particles.

When the plate ratio is too small, the orientation of the particles under the magnetic field may become insufficient. When the plate ratio is too large, the stacking may generate between particles, so that the particles may tend to agglomerate and the noise may generate.

When the coercive force Hc of the particles is too small, the magnetic product may become susceptible to the external magnetic field, resulting in imperfect protection of recorded information. When the coercive force is too large, since a very strong magnetic field may be required for erasing written information, a structural enlargement of the apparatus may be necessitated, which is undesirable in industrial and economical terms.

In the case of granular particles, the average particle size of the magnetic iron oxide particles is preferably 0.01 to 10.0 μm, more preferably 0.1 to 1.0 μm in view of dispersibility. In the case of acicular-like or spindle-shaped particles, the average major axial diameter thereof is 0.1 to 20 μm, more preferably 0.1 to 1.0 μm, and the average aspect ratio (average major axial diameter/average minor axial diameter) of 2/1 to 20/1, more preferably 3/1 to 10/1 in view of dispersibility and orienting characteristics. In the case of plate-like particles, the average particle diameter (average plate surface diameter) thereof is 0.01 to 20.0 μm, more preferably 0.1 to 10.0 μm, and the average thickness thereof is 0.005 to 2.0 μm, more preferably 0.01 to 1.0 μm in view of dispersibility and orienting characteristics.

In the case of magnetite particles, the coercive force Hc of the magnetic iron oxide particles is preferably 100 to 500 Oe, more preferably 250 to 400 Oe. In the case of maghemite particles, the coercive force Hc of the magnetic iron oxide particles is preferably 210 to 400 Oe, more preferably 250 to 380 Oe. In the case of magnetite or maghemite particles doped with Co or having their surfaces coated or modified with a Co compound, the coercive force Hc of the magnetic iron oxide particles is preferably 300 to 1,500 Oe, more preferably 400 to 900 Oe.

In the case of magnetite particles, the saturation magnetization σs of the magnetic particles is preferably 75 to 90 emu/g, more preferably 78 to 90 emu/g. In the case of maghemite particles, the saturation magnetization σs of the magnetic particles is preferably 70 to 85 emu/g, more preferably 75 to 85 emu/g. In the case of magnetite or maghemite particles doped with Co or having their surface coated or modified with a Co compound, the saturation magnetization σs of the magnetic particles is preferably 70 to 90 emu/g, more preferably 75 to 90 emu/g.

The polysiloxanes modified with at least one compound selected from the group consisting of polyethers, polyesters and aralkyls, which can be applied to coat the surfaces of the inorganic particles of the present invention (these polysiloxanes are hereinafter referred to as "modified polysiloxanes"), include the following:

Polyether-modified polysiloxanes represented by the following formula (I):

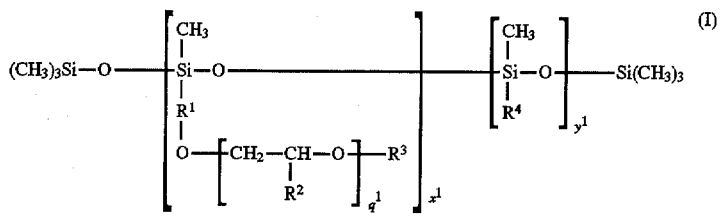

wherein $R^1$ represents $-(CH_2)_{l^1}-$ wherein $l^1$ is a number of 1 to 15, preferably 1 to 11; $R^2$ represents $-(CH_2)_{m^1}-CH_3$ $m^1$ is a number of 0 to 15, preferably 0 to 12; $R^3$ represents H, OH, COOH, NCO, $NH_2$, $-CH=CH_2$, $-C(CH_3)=CH_2$ or $-(CH_2)_{n^1}-CH_3$ wherein $n^1$ is a number of 0 to 15, preferably 0 to 11; $R^4$ represents H or $-(CH_2)_{p^1}-CH_3$ wherein $p^1$ is a number of 0 to 15, preferably 0 to 11; $q^1$ is a number of 1 to 15, preferably 2 to 11; $x^1$ is a number of 1 to 50, preferably 1 to 20; and $y^1$ is a number of 1 to 300, preferably 4 to 150.

Polyester-modified polysiloxanes represented by the following formula (II):

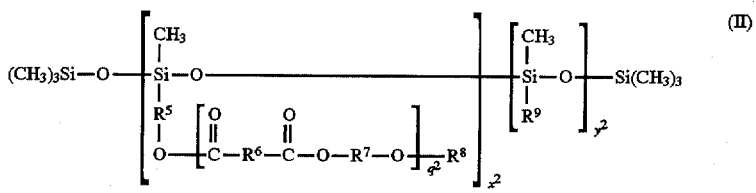

wherein $R^5$ represents $-(CH_2)_{l^2}-$ wherein $l^2$ is a number of 1 to 15, preferably 1 to 11; $R^6$ and $R^7$ represent $-(CH_2)_{m^2}-$ or

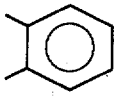

and may be same or different wherein $m^2$ is a number of 1 to 15, preferably 2 to 12; $R^8$ represents H, OH, COOH, NCO, $NH_2$, $-CH=CH_2$, $-C(CH_3)=CH_2$ or $-(CH_2)_{n^2}-CH_3$ wherein $n^2$ is a number of 0 to 15, preferably 0 to 11; $R^9$ represents H or $-(CH_2)_{p^2}-CH_3$ wherein $p^2$ is a number of 0 to 15, preferably 0 to 11; $q^2$ is a number of 1 to 15, preferably 2 to 10; $x^2$ is a number of 1 to 50, preferably 1 to 20; and $y^2$ is a number of 1 to 300, preferably 4 to 150.

Aralkyl-modified polysiloxanes represented by the following formula (III):

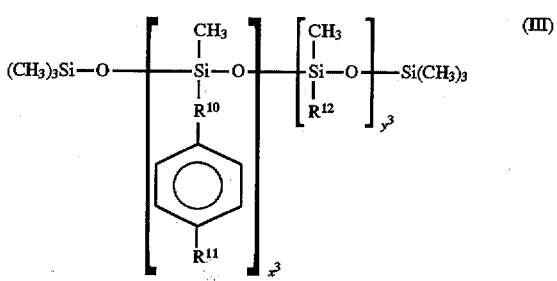

wherein $R^{10}$ represents $-(CH_2)_{l^3}-$ wherein $l^3$ is a number of 1 to 15, preferably 1 to 12; $R^{11}$ represents H, OH, COOH, NCO, $NH_2$, $-CH=CH_2$, $-C(CH_3)=CH_2$ or $-(CH_2)_{m^3}-CH_3$ wherein $m^3$ is a number of 0 to 15, preferably 0 to 12; $R^{12}$ represents H or $-(CH_2)_{n^3}-CH_3$ wherein $n^3$ is a number of 0 to 15, preferably 0 to 11; $x^3$ is a number of 1 to 500, preferably 1 to 300; and $y^3$ is a number of 1 to 500, preferably 1 to 300.

The number-average molecular weight of the polyether-modified polysiloxanes represented by the formula (I) is 350 to 500,000, preferably 1,000 to 100,000, more preferably 2,000 to 50,000.

The number-average molecular weight of the polyester-modified polysiloxanes represented by the formula (II) is 400 to 500,000, preferably 1,000 to 100,000, more preferably 2,000 to 50,000.

The number-average molecular weight of the aralkyl-modified polysiloxanes represented by the formula (III) is 350 to 500,000, preferably 1,000 to 100,000, more preferably 2,000 to 50,000.

Examples of the above-described modified polysiloxanes usable in the present invention include BYK-320, BYK-325 and BYK-080 (trade names, produced by BYK Chemie Co., Ltd.) as polyether-modified polysiloxanes; BYK-310 (trade name, produced by BYK Chemie Co., Ltd.) as polyester-modified polysiloxane; and BYK-322 (trade name, produced by BYK Chemie Co., Ltd.) as aralkyl-modified polysiloxane.

The amount of the modified polysiloxane coating the modified particles of the present invention is preferably 0.01 to 10% by weight, more preferably 0.05 to 5.0% by weight (calculated as C) based on the inorganic colored particles as the core particles. When the coating amount of the said modified polysiloxane is less than 0.01% by weight, it may be hardly possible to obtain the modified particles having excellent dispersibility. When the coating amount exceeds 10% by weight, although it is possible to obtain the desired modified particles with excellent dispersibility, the effect of the modified polysiloxane is at saturation and it is of no avail to add more than 10% by weight.

As for the dispersibility of the inorganic colored particles coated on the surface thereof with a modified polysiloxane (modified polysiloxane-coated inorganic colored particles) according to the present invention when used in a solvent-type paint, in the case of red iron oxide particles, gloss of the coating film is not less than 85% when the dispersion time is 45 minutes, and not less than 90% when the dispersion time is 90 minutes, with the reduction percentage of gloss being not more than 6%. In the case of yellow iron oxide hydroxide particles, gloss of the coating film is not less than 80% when the dispersion time is 45 minutes and not less than 85% when the dispersion time is 90 minutes, with the reduction percentage of gloss being not more than 8%. In the case of black iron oxide particles, gloss of the coating film is not less than 80% when the dispersion time is 45 minutes and not less than 85% when the dispersion time is 90 minutes, with the reduction percentage of gloss being not more than 10%. In the case of brown iron oxide particles, gloss of the coating film is not less than 80% when the dispersion time is 45 minutes and not less than 85% when the dispersion time is 90 minutes, with the reduction percentage of gloss being not more than 10%.

As for the dispersibility of the modified polysiloxane-coated inorganic colored particles other than the said colored iron oxide particles and yellow iron oxide hydroxide particles according to the present invention when used in a solvent-type paint, gloss of the coating film is not less than 77% when the dispersion time is 45 minutes and not less than 81% when the dispersion time is 90 minutes, with the reduction percentage of gloss being not more than 10%.

When the modified polysiloxane-coated inorganic colored particles of the present invention are used for a water-based paint, in the case of red iron oxide particles, gloss of the coating film is not less than 80% when the dispersion time is 45 minutes and not less than 85% when the dispersion time is 90 minutes, with the reduction percentage of gloss being not more than 10%. In the case of yellow iron oxide hydroxide particles, gloss of the coating film is not less than 80% when the dispersion time is 45 minutes and not less than 85% when the dispersion time is 90 minutes, with the reduction percentage of gloss being not more than 10%. In the case of black iron particles, gloss of the coating film is not less than 70% when the dispersion time is 45 minutes and not less than 75% when the dispersion time is 90 minutes, with the reduction percentage of gloss being not more than 15%. In the case of brown iron oxide particles, gloss of the coating film is not less than 70% when the dispersion time is 45 minutes and not less than 75% when the dispersion time is 90 minutes, with the reduction percentage of gloss being not more than 15%.

As for the dispersibility of the modified polysiloxane-coated inorganic colored particles other than the said colored iron oxide particles and yellow iron oxide hydroxide particles when used in a water-based paint, the gloss of the coating film is not less than 75% when the dispersion time is 45 minutes and not less than 80% when the dispersion time is 90 minutes, with the reduction percentage of gloss being not more 10%.

As for dispersibility of the modified polysiloxane-coated magnetic particles of the present invention when used in a solvent-type paint, the squareness is not less than 0.87, preferably not less than 0.88, the roughness (Ra) of the coating film is not more than 0.37 µm, preferably not more than 0.35 µm, the Mean-Square Roughness (RMS) of the coating film is not more than 0.44 µm, preferably not more than 0.42 µm, and the changing percentage of Ra after dilution of the coating material showing dispersion stability is not more than 8.9%, preferably not more than 8.5%.

As for the dispersibility of the modified polysiloxane-coated magnetic particles of the present invention when used in a water-based paint, the squareness ratio is not less than 0.86, preferably not less than 0.88, the roughness (Ra) of the coating film is not more than 0.35 µm, preferably not more than 0.30 µm, the RMS is not more than 0.41 µm, preferably not more than 0.36 µm, the changing percentage of Ra on the coating film formed by applying a coating composition after dilution of the coating material, showing dispersion stability is not more than 15%, preferably not more than 10%, and the changing percentage of Ra on the coating film formed by applying a coating composition after preservation of the paint, showing storage stability is not more than 0.45 µm, preferably not more than 0.35 µm.

In the modified particles of the present invention, it is preferable that a coating film of squaric acid (3,4-dihydroxy-3-cyclobutene-1,2-dione) be formed between the inorganic particle surface and the modified polysiloxane coating layer.

The coating amount of squaric acid in the modified particles according to the present invention is preferably 0.01 to 10% by weight (calculated as C) based on the inorganic particles as the core particles. When the coating amount of squaric acid coat is less than 0.01% by weight, it may be hardly possible to obtain the modified particles with excellent dispersibility. When the coating amount exceeds 10% by weight, although it is possible to obtain the desired modified particles with excellent dispersibility, the effect of the squaric acid is saturated and it is of no significance to add the squaric acid more than 10% by weight.

The weight ratio of the coating amount of modified polysiloxane to that of squaric acid in the modified particles according to the present invention is preferably 1:1,000 to 1,000:1, more preferably 1:100 to 100:1, even more preferably 50:1 to 1:50.

As for the dispersibility of the inorganic colored particles coated on the surface thereof with squaric acid and further coated on the surface of the coating layer of squaric acid with a modified polysiloxane (double-coated inorganic colored particles) according to the present invention when used in a solvent-type paint, in the case of red iron oxide particles, gloss of the coating film is not less than 85% when the dispersion time is 45 minutes and not less than 90% when the dispersion time is 90 minutes, with the reduction percentage of gloss being not more than 5%. In the case of yellow iron oxide hydroxide particles, gloss of the coating film is not less than 85% when the dispersion time is 45 minutes and not less than 90% when the dispersion time is 90 minutes, with the reduction percentage of gloss being not more than 5%. In the case of black iron particles, gloss of the coating film is not less than 85% when the dispersion time is 45 minutes and not less than 90% when the dispersion time is 90 minutes, with the reduction percentage of gloss being not more than 5%. In the case of brown iron oxide particles, gloss of the coating film is not less than 80% when the dispersion time is 45 minutes and not less than 85% when the dispersion time is 90 minutes, with the reduction percentage of gloss being not more than 5%.

As for the dispersibility of the said double-coated inorganic colored particles other than the said colored iron oxide particles and yellow iron oxide hydroxide particles according to the present invention when used in a solvent-type paint, gloss of the coating film is not less than 80% when the dispersion time is 45 minutes and not less than 83% when the dispersion time is 90 minutes, with the reduction percentage of gloss being not more than 10%.

As for the dispersibility of the said double-coated inorganic colored particles of the present invention when used in a water-based paint, in the case of red iron oxide particles, gloss of the coating film is not less than 80% when the dispersion time is 45 minutes and not less than 85% when the dispersion time is 90 minutes, with the reduction percentage of gloss being not more than 5%. In the case of yellow iron oxide hydroxide particles, gloss of the coating film is not less than 80% when the dispersion time is 45 minutes and not less than 85% when the dispersion time is 90 minutes, with the reduction percentage of gloss being not more than 5%. In the case of black iron particles, gloss of the coating film is not less than 80% when the dispersion time is 45 minutes and not less than 85% when the dispersion time is 90 minutes, with the reduction percentage of gloss being not more than 5%. In the case of brown iron oxide particles, gloss of the coating film is not less than 80% when the dispersion time is 45 minutes and not less than 85% when the dispersion time is 90 minutes, with the reduction percentage of gloss being not more than 5%.

As for the dispersibility of the said double-coated inorganic colored particles other than the said colored iron oxide particles and yellow iron oxide hydroxide particles according to the present invention when used in a water-based paint, gloss of the coating film is not less than 82% when the dispersion time is 45 minutes and not less than 85% when the dispersion time is 90 minutes, with the reduction percentage of gloss being not more than 8%.

As for the dispersibility of the magnetic particles coated on the surface thereof squaric acid and further coated on the surface of the coating layer of squaric acid with a modified polysiloxane (double-coated magnetic particles) according to the present invention when used in a solvent-type paint, the squareness is not less than 0.88, preferably not less than 0.89, the roughness (Ra) of the coating film is not more than 0.35 µm, preferably not more than 0.33 µm, the Mean-Square Roughness (RMS) is not more than 0.43 µm, preferably not more than 0.42 µm, and the changing percentage of Ra is not more than 8.0%, preferably not more than 7.5%.

As for the dispersibility of the said double-coated magnetic particles when used in a water-based paint, the squareness is not less than 0.86, preferably not less than 0.88, Ra of the coating film is not more than 0.35 µm, preferably not more than 0.30 µm, RMS is not more than 0.40 µm, preferably not more than 0.35 µm, the changing percentage of Ra on the coating film foamed by applying a coating composition after dilution of the coating material, showing dispersion stability is not more than 12.0%, preferably not more than 10.0%, and the Ra on the coating film formed by applying a coating composition after preservation of the coating material, showing storage stability is not more than 0.40 µm, preferably not more than 0.30 µm.

As for the ratio of the modified particles to the base material of the paint in the present invention, the amount of the said modified particles is 0.1 to 200 parts by weight, preferably 0.1 to 100 parts by weight, more preferably 0.1 to 50 parts by weight based on 100 parts by weight of the base material of the paint in view of handling of the coating material.

The paint base material used for solvent-type paints in the present invention comprises a resin, a solvent and optionally suitable additives such as extender pigment, drying accelerator, surfactant, curing promoter, auxiliaries, etc.

The amount of the solvent in the paint according to the present invention is 50 to 5,000 parts by weight, preferably 100 to 2,000 parts by weight based on 100 parts by weight of the resin. When the amount of the solvent is less than 50 parts by weight based on 100 parts by weight of the resin, the vehicle viscosity may become too high to perform homogeneous mixing and dispersion. When the amount exceeds 5,000 parts by weight, the solvent moiety in the coating composition increases to such an extent that dispersing Shear force does not act to the particles during mixing and dispersion.

The resins usable as a component of the base material of the paint in the present invention include those commonly used for solvent-type paints, such as vinyl chloride-vinylacetate copolymer resin, vinyl chloride resin, vinyl acetate resin, nitrocellulose resin, polyvinyl butyral resin, acrylic resin, alkyd resin, polyester resin, polyurethane resin, epoxy resin, phenol resin, melamine resin, amino resin, etc. For water-based paints, the commonly used resins such as water-soluble alkyd resins, water-soluble acrylic resin, water-soluble urethane resin, water-soluble epoxy resin, water-soluble melamine resin, acrylic emulsion resin, acryl-styrene emulsion resin, urethane emulsion resin, epoxy emulsion resin, vinyl acetate emulsion resin, etc., can be used.

As solvent, there can be used those commonly employed for solvent-type paints, such as toluene, xylene, butyl acetate, methyl acetate, methyl isobutyl ketone, butyl cellosolve, ethyl cellosolve, butyl alcohol, methyl ethyl ketone, cyclohexanone, etc. The paint base material used for water-based paints in the present invention comprises a resin, water and optionally a solvent. For water-based paints, butyl cellosolve, butyl alcohol and other commonly used solvents can be employed.

As defoaming agent, the commercially available products such as Nopco 8034 (trade name), SN Defoamer 477 (trade name), SN Defoamer 5013 (trade name), SN Defoamer 247 (trade name), SN Defoamer 382 (trade name) (the above products being available from Sannopco Ltd.), Antifoam 08 (trade name), Emulgen 903 (both being available from Kao Corp.), etc., can be used.

The magnetic recording sheets in the present invention are the ones in which a magnetic layer is formed at least partly on a non-magnetic substrate. A hiding layer for hiding the color of the magnetic layer may be provided on the magnetic layer. There may, further, be provided an adhesive layer for bettering adhesiveness between the magnetic layer and the non-magnetic substrate, and a protective layer for protecting the magnetic layer.

Non-magnetic substrates usable in the present invention include plastics such as vinyl chloride resin, polyesters, etc., paper-plastic composites (paper/polyester/paper, polyester/paper/polyester, etc.) and papers such as slick paper.

Usually, vinyl chloride resin substrate is used for bank card, credit card, cash card, POS card, key card, etc., polyester substrate is used for sealess type commutation ticket, program card, telephone card, etc., composite paper substrate is used for expressway coupon ticket, postal savings register, seal type commutation ticket, etc., and paper substrate is used for expressway pass, process management card, some-types of POS card, railway ticket, pari-mutuel ticket, etc.

In case of vinyl resin substrate, the thickness thereof is preferably 100 to 1,000 µm, more preferably 500 to 900 µm. In the case of polyester substrate, the thickness thereof is preferably 10 to 500 µm, more preferably 100 to 300 µm. In case of the composite paper substrate, the thickness thereof is preferably 50 to 500 µm, more preferably 100 to 300 µm. In case of the slick paper substrate, the thickness thereof is preferably 50 to 1,000 µm, more preferably 100 to 800 µm.

A magnetic layer is provided at a part on one side of the non-magnetic substrate, over the entirety of one side of the substrate, at a part on one side and entirety of the other side of the substrate, or over the entirety of both sides of the substrate. The thickness of the magnetic layer is preferably 0.5 to 20.0 µm, more preferably 1.0 to 10.0 µm.

A process for producing the above-described modified particles of the present invention is illustrated below.

The shape, size, BET specific surface area, coercive force Hc and saturation magnetization σs of the inorganic particles used as core particles in the present invention are substantially the same as those of the above-described modified particles which have been coated with a specific modified polysiloxane.

It is essential that the polysiloxane used for coating the inorganic particles in the present invention is modified by at least one compound selected from polyethers, polyesters and aralkyls. It should be noted that when using afore-mentioned known organopolysiloxanes such as polydimethylsiloxane, methylphenylpolysiloxane, methylhydrogenpolysiloxane, dimethylpolysiloxy chloride, alkoxypolysiloxane, amino groupend modified polysiloxane, etc., or silane coupling agents, it is impossible to obtain the modified particles with excellent dispersibility such as provided in the present invention, as noted from the Comparative Examples given later.

The afore-mentioned commercially available modified polysiloxanes usable in the present invention are all in the form of solution, and in use, they can be added in the form as they are to the core inorganic particles.

The amount of the modified polysiloxane which is added is preferably 0.05 to 20.0% by weight based on the inorganic particles. When the amount of the modified polysiloxane is less than 0.05% by weight, it may be hardly possible to obtain the magnetic particles with excellent dispersibility envisaged in the present invention. When the amount of the modified polysiloxane exceeds 20.0% by weight, although there can be obtained the desired inorganic particles with excellent dispersibility, the effect of polysiloxane addition is saturated and it is meaningless to add it more than necessary.

In the present invention, mixing of the inorganic particles and the modified polysiloxane is carried out at a temperature not less than 80° C. When the mixing temperature is less than 80° C., the modified polysiloxane viscosity becomes excessively high, thereby hindering uniform coating of the polysiloxane on the inorganic particle surfaces and making it unable to obtain the desired modified particles.

The inorganic particles, before mixed with a modified polysiloxane, are preferably heated at a temperature not less than 80° C. to reduce the water content to not more than 0.2% by weight. When the water content of the inorganic particles is too high, the particles are strongly agglomerated each other by the action of water forming a liquid bridge between the particles, so that it may be hardly possible to effect uniform coating on the individual particles.

Mixing can be performed by a high-speed agitation-type mixer commonly used for mixing the inorganic particles and surface treating agents, such as Henschel mixer, speed mixer, ball cutter, power mixer, hybrid mixer, etc. Henschel mixer is recommended in view of uniform coating of modified polysiloxane.

As for the stirring time, it is essential that the inorganic particles and a modified polysiloxane be mixed up sufficiently in a high-speed agitation mixer, and it is preferable at least 5-minute stirring, more preferably not less than 10 minutes.

Squaric acid, which is available as powder, may be directly added to water or may be previously dissolved in water and added to water so as to adjust a concentration thereof to 0.1 to 50 g/l, preferably 0.5 to 10 g/l, and then added to the inorganic particles, the latter being preferred.

In the present invention, the squaric acid coating treatment can be accomplished by mixing the inorganic particles and an aqueous squaric acid solution at a temperature of 10° to 90° C., filtering and drying.

As for the order of addition of the inorganic particles and aqueous squaric acid solution, either of them may be added first, or both of them may be added at the same time.

The amount of squaric acid added is 0.01 to 30.0% by weight, preferably 0.02 to 25.0% by weight based on the inorganic particles. When its amount added is less than 0.01% by weight, it may be hardly possible to obtain the modified particles with excellent dispersibility. When the squaric acid amount exceeds 30.0% by weight, although there can be obtained the desired modified particles with excellent dispersibility, the effect of addition of squaric acid is saturated and it is of no significance to add it in a greater amount than 30.0% by weight.

As for the aqueous suspension stirring time, it is essential that the inorganic particles and squaric acid be mixed up sufficiently and it is preferable at least 5 minutes, preferably not less than 10 minutes.

For producing a magnetic recording sheet in accordance with the present invention, it is possible to employ various methods, for example, a direct coating method in which a magnetic coating material is directly coated on a non-magnetic substrate, a tape bonding method in which a separately produced magnetic tape is bonded on a non-magnetic substrate, and a magnetic layer transferring method in which a transfer-type magnetic tape is attached on a non-magnetic substrate and then the base is striped off.

The essential point of the aspect of the present invention is that the modified particles having their surfaces coated with a modified polysiloxane show excellent dispersibility, specifically excellent dispersion facility, excellent dispersion homogeneity and high dispersion stability, in both solvent-type and water-based paints.

Regarding the reason why the inorganic particles coated with a modified polysiloxane (namely the modified particles of the present invention) show excellent dispersibility especially in water-based paints, the present inventors refer to the following facts.

In a solvent-type paint, a resin is adsorbed on the inorganic particle surfaces with a spread, so that when the inorganic particles approach each other, there is produced a large repulsive force, so-called steric repulsion effect, by the adsorbed resin to hinder the approach of the inorganic particles to each other, thus allowing the particles to stay stably in the paint.

In a water-based paint, however, since a resin on the inorganic particles in the vehicles exists in the form of particles without a spread on the particle surfaces as mentioned above, the effect of steric repulsion between inorganic particles in a solvent-type paint tends to fail to take place or is slight if produced, so that dispersion of the particles can not be effected smoothly.

It is known that, generally, the higher the absolute value of zeta potential of the suspended particles in a paint, the better is the dispersibility of the suspended particles due to electrostatic repulsion. In the case of the modified particles having their surfaces coated with a modified polysiloxane according to the present invention, the zeta potential in a water-based paint is about −40 to −80 mV, specifically about −45 to −80 mV (in case of magnetic modified particles), or −25 to −55 mV, specifically about −30 to −55 mV (in case of inorganic colored modified particles), as shown in the Examples described later, and the absolute values of the zeta potential is high, so that in a water-based paint the particle surfaces tend to be charged negatively, producing a large electrostatic repulsion between the particles. Further, since the molecular chains of a polyether, polyester or aralkyl are adsorbed on the particle surfaces with a spread, the particle agglomerates tend to break up and the particles are allowed to disperse to a state approximating that of the primary particles due to a synergistic effect of the large electrostatic repulsion and steric repulsion. Thus, the said modified particles are easy to disperse and can be dispersed homogeneously.

Also, after once dispersed to a state approximating that of the primary particles, the said modified particles can be maintained in a dispersed state for a long time by virtue of electrostatic repulsion between the particles, thereby ensuring excellent dispersion stability of the said particles.

The modified particles according to the present invention are the colored particles which can be easily and homogeneously dispersed and have excellent dispersion stability in paints, especially in water-based paints, so that they are suited for use as colored particles for paints or varnishes.

The water-based paint according to the present invention has excellent storage stability owing to the said excellent dispersion characteristics of the modified particles blended in the base material of a paint, especially a water-based paint.

Also, the modified particles according to the present invention are suited for use as magnetic particles in magnetic recording sheets since the said modified particles are the magnetic particles showing excellent dispersibility and orientability in paints, especially in water-based paints, as explained in the Examples given below.

Further, the water-based paint produced by using the magnetic particles according to the present invention has good compatibility with paper because of good dispersibility and orientability of the magnetic particles contained therein and also because of aqueous preparation, so that the said water-based paint finds particularly advantageous application to the magnetic recording sheets using paper as non-magnetic substrate.

EXAMPLES

The present invention will now be described in more detail with reference to the following examples, but the present invention is not restricted to those examples and various modifications are possible within the scope of the invention.

The average diameter of the particles shown in the following Examples and Comparative Examples is the average of the measurements of diameter from an electron micrograph, and the specific surface area of the particles was measured by the BET method.

The thickness and plate ratio of the plate-like particles shown here are the values determined from the specific surface area of the particles measured by the BET method and their average diameter measured in the manner described above.

The particle shape was observed under a transmission electron micrograph and a scanning electron micrograph.

The coating amounts of the modified polysiloxane and squaric acid were shown by the amount of carbon measured by using Horiba Metallic Carbon and Sulfur Analyzer EMIA-2200 (mfd. by Horiba Seisakusho Ltd.).

The dispersibility of the modified inorganic pigment was shown in terms of gloss of the coating film as measured by a digital gloss meter UGV-5D (mfd. by Suga Testing Machine Co., Ltd.) at an angle of incidence of 20°. The higher the gloss, the better is dispersibility. The practical value of gloss is not less than 70%.

The dispersion facility (easy dispersibility) of the modified inorganic pigment was in terms of gloss of the coating film formed by applying a paint obtained by blending the specific component materials at the specific ratios shown below and dispersing a mill base therein for 45 minutes, on a cold rolled steel plate (0.8 mm×70 mm×150 mm) (JIS G 3141) to a coating thickness of 150 µm, followed by drying. The practical value of gloss is not less than 70%.

The dispersion homogeneity (homogeneous dispersibility) of the modified inorganic pigment was shown in terms of gloss of the coating film formed by applying a paint obtained by blending the specific component materials at the specific ratios shown below and dispersing a mill base therein for 90 minutes (at this point the dispersion is in a state of saturation), on a cold rolled steel plate (0.8 mm×70 mm×150 mm) (JIS G 3141) to a coating thickness of 150 µm, followed by drying. The practical value of gloss is not less than 75%.

As for dispersion stability of the modified inorganic pigment, a paint prepared by blending the specific component materials at the specific ratios shown below, dispersing a mill base therein for 90 minutes and then diluting the product by adding, in the case of a solvent-type paint, a thinner in an amount of 40% based on the solvent-type paint, and in the case of a water-based paint, water in an amount of 40% based on the water-based paint, was applied on a cold rolled steel plate (0.8 mm×70 mm×150 mm) (JIS G 3141) to a coating thickness of 150 µm, followed by drying to form a coat and its gloss was measured. The dispersion stability was shown by the difference between gloss of the coating film formed by applying a paint after dilution and that before dilution. In the case of the present invention, the smaller the absolute value of the difference, the better is dispersion stability. The practical value of the differnce of gloss is not more than 15%.

The storage stability of a water-based paint containing the modified inorganic pigment was shown in terms of gloss of the coating film formed by applying a paint prepared by blending the specific component materials at the specific ratios shown below, dispersing a base mill therein for 90 minutes and allowing the preparation to stand for a day, on a cold rolled steel plate (0.8 mm×70 mm×150 mm) (JIS G 3141) to a coating thickness of 150 µm, followed by drying. The practical value of gloss is not less than 60%.

The smoothness of the magnetic coat surface was shown by center line average roughness (Ra) and mean-square roughness (RMS) determined by measuring the surface smoothness of a coating film formed by applying a paint which was prepared by blending the component materials at the specific ratios described later and dispersing a mill base therein, on a paper-made base film, followed by magnetic field orientation and drying, by using a surface shape meter SURFCOM 575A (mfd. by Tokyo Seimitsu Co., Ltd.).

The uniform dispersibility of the magnetic modified particles is shown in terms of the degree of smoothness of the final magnetic coating film. The smaller the values of Ra and RMS, the better are surface smoothness of the coating film and uniform dispersibility of the magnetic particles in the vehicle.

The dispersibility of the modified magnetic particles was shown by dispersion facility, dispersion stability, storage stability, smoothness of the coating film surface and orientability of the particles in the magnetic layer.

The dispersion facility (easy dispersibility) of the modified magnetic particles was shown by a comparison (difference) of the properties of the magnetic layers formed by using two different kinds of magnetic paint prepared with different durations of mill base dispersion. The smaller the difference, the better is dispersion facility. The practical value of the difference of Ra is not more than 0.1 µm. The practical value of the difference of RS is not more than 0.05.

As for dispersion stability of the modified magnetic particles, diluted paints were prepared by in case of a solvent-type paint, adding a solvent (MEK/toluene/cyclohexane=5/3/2) (40%) to a solvent-type paint obtained by blending the component materials in the specific ratios described later and mixing and dispersing a mill base (2)

therein for 120 minutes, and in the case of a water-based paint, adding water (40%) to a water-based paint prepared by mixing and dispersing the said mill base for 60 minutes, and the respective diluted paint was applied to a base film to a thickness of 50 μm and dried to form a magnetic layer and its surface roughness Ra was measured.

The dispersion stability of the said modified magnetic particles was shown by the percentage of increase of the said surface roughness Ra over that of the magnetic layer formed in the same way as described above by using a non-diluted paint. The smaller the percentage, the better is dispersion stability. The practical value is not more than 10%.

The storage stability of the modified magnetic particles in a water-based paint was shown in terms of surface roughness Ra of a coating film formed by applying a paint prepared by blending the component materials in the specified ratios described later and dispersing a base mill therein for 60 minutes, the thus prepared paint being allowed to stand for a whole day, on a paper-made base film to a thickness of 50 μm, followed by drying. A smaller value indicates better storage stability. The practical value is not more than 0.5 μm.

The orientability of the modified magnetic particles was shown in terms of squareness (RS) of a coating film formed by applying a paint obtained by blending the component materials in the specific ratios described later and dispersing a mill base therein, on a substrate, followed by magnetic field orientation and drying. The higher the squareness, the better is orientability of the particles, hence the more suited are the particles for magnetic recording sheets.

The zeta potential of the modified particles in a water-based paint was determined by a zeta potentiometer Model 501 (mfd. by Pen-Kem Corp.) using a suspension prepared by adding 0.5 g of a paint which had been obtained by blending the specific component materials in the specific ratios shown below and dispersing a mill base therein for 90 minutes, to 100 g of pure water, and dispersing the paint by an ultrasonic disperser C-10 (mfd. by Ultrasonic Industry Co., Ltd.) for one minute.

Production of colored iron oxide particles

Example 1

2.5 kg of granular red iron oxide ($\alpha$-$Fe_2O_3$) particles having an average diameter of 0.25 μm were mixed in a 85° C. Henschel mixer (10-litre capacity) operated at 1,200 r.p.m. for 10 minutes to remove water, reducing the water content of the said red iron oxide particles to 0.11% by weight.

With the Henschel mixer temperature maintained at 85° C., 25 g of a polyether-modified polysiloxane BYK-080 (trade name, produced by BYK Chemie Co., Ltd.) (active ingredient: 100%) (corresponding to 1.0% by weight based on red iron oxide particles) was added at a rate of 2.5 g/min over a period of 10 minutes and mixed for 20 minutes to coat the red iron oxide particle surfaces with the said polyether-modified polysiloxane.

Then the Henschel mixer, with mixing contended, was cooled to room temperature to obtain the red iron oxide particles having their surfaces coated with the polyether-modified polysiloxane.

The obtained red iron oxide particles had a polyether-modified polysiloxane coat of 0.54% by weight.

Examples 2-6 and Comparative Examples 6-13

The same procedure as in Example 1 was carried out except that the kind, amount and heat treatment temperature of the iron oxide particles or iron oxide hydroxide particles and the kind, amount and mixing temperature of the modified polysiloxane were varied to obtain the treated iron oxide particles or iron oxide hydroxide particles. The treating conditions are shown in Tables 1 and 2.

Comparative Examples 1-5

For comparison, there were prepared the non treated iron oxide particles or iron oxide hydroxide particles. The properties of these iron oxide particles or iron oxide hydroxide particles are shown in Table 2.

TABLE 1

| | Coating treatment Iron oxide particles or iron oxide hydroxide particles | | |
|---|---|---|---|
| | Kind | Shape | Major axial diameter (μm) |
| Example 1 | Red iron oxide | Granular | 0.25 |
| Example 2 | Red iron oxide | Granular | 0.25 |
| Example 3 | Red iron oxide | Granular | 0.20 |
| Example 4 | Yellow iron oxide | Acicular | 0.41 |
| Example 5 | Black iron oxide | Granular | 0.30 |
| Example 6 | Brown iron oxide | Granular | 0.28 |
| Example 7 | Red iron oxide | Granular | 0.25 |
| Example 8 | Red iron oxide | Granular | 0.25 |
| Example 9 | Red iron oxide | Granular | 0.20 |
| Example 10 | Yellow iron oxide | Acicular | 0.41 |
| Example 11 | Black iron oxide | Granular | 0.30 |
| Example 12 | Brown iron oxide | Granular | 0.28 |

| | Coating treatment Iron oxide particles or iron oxide hydroxide particles | | |
|---|---|---|---|
| | Minor axial diameter (μm) | BET specific surface area ($m^2$/g) | Amount (kg) |
| Example 1 | — | 7.2 | 2.5 |
| Example 2 | — | 7.2 | 2.5 |
| Example 3 | — | 10.2 | 2.5 |
| Example 4 | 0.08 | 16.9 | 2.0 |
| Example 5 | — | 5.5 | 2.5 |
| Example 6 | — | 6.0 | 2.5 |
| Example 7 | — | 7.2 | 2.5 |
| Example 8 | — | 7.2 | 2.5 |
| Example 9 | — | 10.2 | 2.5 |
| Example 10 | 0.08 | 16.9 | 2.0 |
| Example 11 | — | 5.5 | 2.5 |
| Example 12 | — | 6.0 | 2.5 |

| | Coating treatment Iron oxide particles or iron oxide hydroxide particles Heat treatment | | | |
|---|---|---|---|---|
| | Temp. (°C.) | Residual water content (%) | Squaric acid Kind | Amount added (%) |
| Example 1 | 85 | 0.11 | — | — |
| Example 2 | 90 | 0.08 | — | — |
| Example 3 | 90 | 0.09 | — | — |
| Example 4 | 80 | 0.13 | — | — |
| Example 5 | 85 | 0.10 | — | — |
| Example 6 | 100 | 0.07 | — | — |
| Example 7 | 110 | 0.07 | A | 1.0 |
| Example 8 | 85 | 0.10 | A | 3.0 |
| Example 9 | 120 | 0.05 | A | 5.0 |

TABLE 1-continued

| | | | | |
|---|---|---|---|---|
| Example 10 | 80 | 0.16 | A | 1.0 |
| Example 11 | 90 | 0.10 | A | 0.5 |
| Example 12 | 85 | 0.13 | A | 1.0 |

| | Coating treatment Specific modified polysiloxane | | |
|---|---|---|---|
| | Kind | Amount added (%) | Mixing temperature (°C.) |
| Example 1 | Polyether-modified polysiloxane BYK-080 | 1.0 | 85 |
| Example 2 | Polyether-modified polysiloxane BYK-080 | 0.5 | 110 |
| Example 3 | Polyether-modified polysiloxane BYK-080 | 2.0 | 95 |
| Example 4 | Polyether-modified polysiloxane BYK-325 | 5.0 | 85 |
| Example 5 | Polyether-modified polysiloxane BYK-310 | 1.0 | 95 |
| Example 6 | Polyether-modified polysiloxane BYK-322 | 7.0 | 95 |
| Example 7 | Polyether-modified polysiloxane BYK-080 | 2.0 | 100 |
| Example 8 | Polyether-modified polysiloxane BYK-322 | 0.1 | 90 |
| Example 9 | Polyether-modified polysiloxane BYK-320 | 4.0 | 90 |
| Example 10 | Polyether-modified polysiloxane BYK-310 | 0.5 | 80 |
| Example 11 | Polyether-modified polysiloxane BYK-080 | 3.0 | 85 |
| Example 12 | Polyether-modified polysiloxane BYK-080 | 1.0 | 90 |

A: 3,4-dihydroxy-3-cyclobutene-1,2-dione (produced by Tokyo Kasei Kogyo CO., LTD.)

TABLE 2

| | Coating treatment Iron oxide particles or iron oxide hydroxide particles | | |
|---|---|---|---|
| | Kind | Shape | Major axial diameter (μm) |
| Comp. Example 1 | Red iron oxide | Granular | 0.25 |
| Comp. Example 2 | Red iron oxide | Granular | 0.20 |
| Comp. Example 3 | Yellow iron oxide | Acicular | 0.41 |
| Comp. Example 4 | Black iron oxide | Granular | 0.30 |
| Comp. Example 5 | Brown iron oxide | Granular | 0.28 |
| Comp. Example 6 | Red iron oxide | Granular | 0.25 |
| Comp. Example 7 | Red iron oxide | Granular | 0.25 |
| Comp. Example 8 | Red iron oxide | Granular | 0.25 |
| Comp. Example 9 | Red iron oxide | Granular | 0.25 |
| Comp. Example 10 | Red iron oxide | Granular | 0.25 |
| Comp. Example 11 | Red iron oxide | Granular | 0.25 |
| Comp. Example 12 | Red iron oxide | Granular | 0.25 |
| Comp. Example 13 | Red iron oxide | Granular | 0.25 |
| Comp. Example 14 | Red iron oxide | Granular | 0.25 |

TABLE 2-continued

| | Coating treatment Iron oxide particles or iron oxide hydroxide particles | | |
|---|---|---|---|
| | Minor axial diameter (μm) | BET specific surface area (m²/g) | Amount (kg) |
| Comp. Example 1 | — | 7.2 | — |
| Comp. Example 2 | — | 10.2 | — |
| Comp. Example 3 | 0.08 | 16.9 | — |
| Comp. Example 4 | — | 5.5 | — |
| Comp. Example 5 | — | 6.0 | — |
| Comp. Example 6 | — | 7.2 | 2.5 |
| Comp. Example 7 | — | 7.2 | 2.5 |
| Comp. Example 8 | — | 7.2 | 2.5 |
| Comp. Example 9 | — | 7.2 | 2.5 |
| Comp. Example 10 | — | 7.2 | 2.5 |
| Comp. Example 11 | — | 7.2 | 2.5 |
| Comp. Example 12 | — | 7.2 | 2.5 |
| Comp. Example 13 | — | 7.2 | 2.5 |
| Comp. Example 14 | — | 7.2 | — |

| | Coating treatment Iron oxide particles or iron oxide hydroxide particles Heat treatment | | Squaric acid | |
|---|---|---|---|---|
| | Temp. (°C.) | Residual water content (%) | Kind | Amount added (%) |
| Comp. Example 1 | — | — | — | — |
| Comp. Example 2 | — | — | — | — |
| Comp. Example 3 | — | — | — | — |
| Comp. Example 4 | — | — | — | — |
| Comp. Example 5 | — | — | — | — |
| Comp. Example 6 | 80 | 0.11 | — | — |
| Comp. Example 7 | 85 | 0.12 | — | — |
| Comp. Example 8 | 85 | 0.10 | — | — |
| Comp. Example 9 | 85 | 0.10 | — | — |
| Comp. Example 10 | 85 | 0.11 | — | — |
| Comp. Example 11 | 85 | 0.11 | — | — |
| Comp. Example 12 | 85 | 0.13 | — | — |
| Comp. Example 13 | 85 | 0.12 | — | — |
| Comp. Example 14 | — | — | A | 1.0 |

TABLE 2-continued

| | Coating treatment Specific modified polysiloxane | | |
|---|---|---|---|
| | Kind | Amount added (%) | Mixing temperature (°C.) |
| Comp. Example 1 | — | — | — |
| Comp. Example 2 | — | — | — |
| Comp. Example 3 | — | — | — |
| Comp. Example 4 | — | — | — |
| Comp. Example 5 | — | — | — |
| Comp. Example 6 | Polyether-modified polysiloxane BYK-080 | 0.005 | 90 |
| Comp. Example 7 | Polydimethylsiloxane | 1.0 | 85 |
| Comp. Example 8 | Methyl hydrogensiloxane | 2.0 | 85 |
| Comp. Example 9 | Alkoxypolysiloxane | 1.0 | 85 |
| Comp. Example 10 | Methylphenyl-polysiloxane | 4.0 | 85 |
| Comp. Example 11 | Dimethylpolysiloxy chloride | 5.0 | 85 |
| Comp. Example 12 | γ-glycidoxypropyl-trimethoxysilane | 0.5 | 80 |
| Comp. Example 13 | Amino group end modified polysiloxane | 1.0 | 80 |
| Comp. Example 14 | — | — | — |

A: 3,4-dihydroxy-3-cyclobutene-1,2-dione (produced by Tokyo Lasei Kogyo CO., LTD.)

Example 7

Water was added to a squaric acid solution prepared previously by adding 5 litres of pure water to 30 g of squaric acid (3,4-dihydroxy-3-cyclobutene-1,2-dione) (produced by Tokyo Kasei Kogyo CO., LTD.) to make the total amount 25 litres, and the mixture was stirred well by a stirrer. The squaric acid concentration in the resulting solution was 1.2 g/litre.

To this squaric acid solution, 3 kg of granular red iron oxide ($\alpha$-$Fe_2O_3$) particles having an average diameter of 0.25 μm were added gradually, and after mixing and stirring for 30 minutes by a homomixer, the resultant mixture was filtered, dried and pulverized to obtain the red iron oxide particles having their surfaces coated with squaric acid.

The squaric acid coat of the thus obtained red iron oxide particles was 0.41% by weight, calculated as C, based on the particles.

2.5 kg of the said squaric acid-coated red iron oxide particles were mixed in a 110° C. Henschel mixer (10-litre capacity) operated at 1,200 r.p.m. for 10 minutes to remove water, reducing the water content of the red iron oxide particles to 0.07% by weight.

With the Henschel mixer temperature maintained at 100° C., 50 g of a polyether-modified polysiloxane BYK-080 (active ingredient: 100%) was added at a rate of 2.5 g/min over a period of 20 minutes, followed by mixing for 20 minutes to coat the red iron oxide particle surfaces with the said polyether-modified polysiloxane.

Then the Henschel mixer, with mixing continued, was cooled to room temperature to obtain the red iron oxide particles having their surfaces coated with the said polyether-modified polysiloxane.

The coating amount of the polyether-modified polysiloxane on the red iron oxide particles was 1.10%, calculated as C, based on the particles.

Examples 8–12 & Comparative Example 14

The same procedure as in Example 7 was carried out except that the kind, amount, heat treatment (whether conducted or not) and temperature of the iron oxide particles or iron oxide hydroxide particles, the kind, amount and mixing temperature of the modified polysiloxane, treatment therewith (whether conducted or not), and the kind and amount of squaric acid were varied to obtain the treated iron oxide particles or iron oxide hydroxide particles. The treating conditions in these Examples are shown in Table 1.

Production of solvent-type paints containing colored iron oxide particles

Example 13

Using 10 g of the inorganic colored particles obtained in Example 1, the following materials were blended in the specified ratios in a 140 ml glass pot and then mixed and dispersed together with 90 g of 3 mmφ glass beads for 45 minutes or 90 minutes by a paint shaker to prepare a mill base:

| Iron oxide particles obtained in Example 1 | 12.2 parts by weight |
|---|---|
| Aminoalkyd resin (ARAMIC No. 1026, produced by Kansai Paint Co., Ltd.) | 19.5 parts by weight |
| Thinner | 7.3 parts by weight |

This mill base was blended with an aminoalkyd resin in the ratios specified below and then further mixed and dispersed for 15 minutes by a paint shaker to obtain a solvent-type paint:

| Mill base | 39.0 parts by weight |
|---|---|
| Aminoalkyd resin (ARAMIC No. 1026 produced by Kansai Paint Co., Ltd.) | 61.0 parts by weight |

By way of comparison, a paint was produced in the same procedure as Example 13 except that the red iron oxide particles were not coated with the polyether-modified polysiloxane BYK-080 and added in the coating composition in the course of preparation of the solvent-type paint (the method same as disclosed in the afore-mentioned Japanese Patent Application Laid-open (KOKAI) 62-187772). Gloss of the coating film formed by using this coating material was 77% when the dispersion time was 45 minutes and 83% when the dispersion time was 90 minutes, with the reduction percentage of gloss being 10%.

Examples 14–24 and Comparative Examples 15–28

The same procedure as in Example 13 was carried out except that the kind of iron oxide particles or iron oxide hydroxide particles was varied to produce the solvent-type paints.

The properties of the obtained solvent-type paint are shown in Table 3 and Table 4.

TABLE 3

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Example 13 | Example 1 | — | 0.54 |
| Example 14 | Example 2 | — | 0.28 |
| Example 15 | Example 3 | — | 1.05 |
| Example 16 | Example 4 | — | 1.40 |
| Example 17 | Example 5 | — | 0.14 |
| Example 18 | Example 6 | — | 3.66 |
| Example 19 | Example 7 | 0.41 | 1.10 |
| Example 20 | Example 8 | 1.25 | 0.06 |
| Example 21 | Example 9 | 2.05 | 1.10 |
| Example 22 | Example 10 | 0.42 | 0.07 |
| Example 23 | Example 11 | 0.20 | 1.65 |
| Example 24 | Example 12 | 0.40 | 0.55 |

| | Solvent-type paint | | |
|---|---|---|---|
| | Gloss | | |
| | Mill base dispersion time 45 minutes (%) | Mill base dispersion time 90 minutes (%) | Gloss reduction percentage (%) |
| Example 13 | 90 | 95 | 5 |
| Example 14 | 88 | 93 | 6 |
| Example 15 | 93 | 96 | 5 |
| Example 16 | 82 | 87 | 8 |
| Example 17 | 82 | 85 | 6 |
| Example 18 | 81 | 86 | 7 |
| Example 19 | 98 | 99 | 0 |
| Example 20 | 85 | 90 | 3 |
| Example 21 | 101 | 105 | 1 |
| Example 22 | 88 | 92 | 3 |
| Example 23 | 88 | 91 | 1 |
| Example 24 | 82 | 86 | 4 |

TABLE 4

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Comp. Example 15 | Comp. Example 1 | — | — |
| Comp. Example 16 | Comp. Example 2 | — | — |
| Comp. Example 17 | Comp. Example 3 | — | — |
| Comp. Example 18 | Comp. Example 4 | — | — |
| Comp. Example 19 | Comp. Example 5 | — | — |
| Comp. Example 20 | Comp. Example 6 | — | 0.003 |
| Comp. Example 21 | Comp. Example 7 | — | 0.33 |
| Comp. Example 22 | Comp. Example 8 | — | 0.43 |
| Comp. Example 23 | Comp. Example 9 | — | 0.61 |
| Comp. Example 24 | Comp. Example 10 | — | 1.67 |
| Comp. Example 25 | Comp. Example 11 | — | 0.69 |
| Comp. Example 26 | Comp. Example 12 | — | 0.15 |
| Comp. Example 27 | Comp. Example 13 | — | 0.34 |
| Comp. Example 28 | Comp. Example 14 | 0.41 | — |

| | Solvent-type paint | | |
|---|---|---|---|
| | Gloss | | |
| | Mill base dispersion time 45 minutes (%) | Mill base dispersion time 90 minutes (%) | Gloss reduction percentage (%) |
| Comp. Example 15 | 75 | 82 | 10 |
| Comp. Example 16 | 73 | 83 | 10 |
| Comp. Example 17 | 70 | 80 | 10 |
| Comp. Example 18 | 70 | 81 | 10 |
| Comp. Example 19 | 72 | 83 | 12 |
| Comp. Example 20 | 78 | 81 | 9 |
| Comp. Example 21 | 79 | 84 | 8 |
| Comp. Example 22 | 70 | 80 | 12 |
| Comp. Example 23 | 75 | 81 | 6 |
| Comp. Example 24 | 77 | 83 | 10 |
| Comp. Example 25 | 70 | 79 | 8 |
| Comp. Example 26 | 65 | 72 | 12 |
| Comp. Example 27 | 74 | 80 | 15 |
| Comp. Example 28 | 82 | 86 | 5 |

Production of water-based paints containing colored iron oxide particles

Example 25

Using 7.62 g of the inorganic colored particles obtained in Example 1, the following materials were blended in the specified ratios in a 140 ml glass pot, and then mixed and dispersed with 90 g of 3 mm$\phi$ glass beads for 45 minutes or 90 minutes by a paint shaker to prepare a mill base:

| | |
|---|---|
| Iron oxide particles obtained in Example 1 | 12.4 parts by weight |
| Water-soluble alkyl resin (trade name: S-118, produced by Dai-Nippon Ink Chemical Industries Co., Ltd.) | 9.0 parts by weight |
| Defoaming agent (trade name: Nopco 8034, produced by Sannopco Ltd.) | 0.1 part by weight |
| Water | 4.8 parts by weight |
| Butyl cellosolve | 4.1 parts by weight |

Using this mill base, the following materials were blended in the specified ratios and further mixed and dispersed by a paint shaker to obtain a water-based paint:

| Mill base | 30.4 parts by weight |
|---|---|
| Water-soluble alkyl resin (trade name: S-118, produced by Dai-Nippon Ink Chemical Industries Co., ltd.) | 46.2 parts by weight |
| Water-soluble melamine resin (trade name: S-695, produced by Dai-Nippon Ink Chemical Industries Co., Ltd.) | 12.6 parts by weight |
| Defoaming agent (trade name: Nopco 8034, produced by Sannopco Ltd.) | 0.1 parts by weight |
| Water | 9.1 parts by weight |
| Butyl cellosolve | 1.6 part by weight |

For the purpose of comparison, a paint was produced by following the same procedure as Example 25 except that the red iron oxide particles were not coated with the polyether-modified polysiloxane BYK-080 and added in the coating composition in the course of preparation of the water-based paint (the method same as disclosed in the afore-mentioned Japanese Patent Application Laid-open (KOKAI) 62-187772). Gloss of the coating film formed by using this paint was 68% when the dispersion time was 45 minutes and 74% when the dispersion time was 90 minutes, with the reduction percentage of gloss being 13%.

Examples 26–36 and Comparative Examples 29–42

The same procedure as in Example 25 was carried out except that the kind of iron oxide particles or iron oxide hydroxide particles was varied to produce the water-based paints.

The properties of the obtained water-based paints are shown in Tables 5 and 6.

TABLE 5

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Example 25 | Example 1 | — | 0.54 |
| Example 26 | Example 2 | — | 0.28 |
| Example 27 | Example 3 | — | 1.05 |
| Example 28 | Example 4 | — | 1.40 |
| Example 29 | Example 5 | — | 0.14 |
| Example 30 | Example 6 | — | 3.66 |
| Example 31 | Example 7 | 0.41 | 1.10 |
| Example 32 | Example 8 | 1.25 | 0.06 |
| Example 33 | Example 9 | 2.05 | 1.10 |
| Example 34 | Example 10 | 0.42 | 0.07 |
| Example 35 | Example 11 | 0.20 | 1.65 |
| Example 36 | Example 12 | 0.40 | 0.55 |

| | Water-based paint Gloss | |
|---|---|---|
| | Mill base dispersion time 45 minutes (%) | Mill base dispersion time 90 minutes (%) |
| Example 25 | 86 | 89 |
| Example 26 | 81 | 86 |
| Example 27 | 88 | 93 |
| Example 28 | 85 | 88 |
| Example 29 | 76 | 80 |

TABLE 5-continued

| | | |
|---|---|---|
| Example 30 | 72 | 78 |
| Example 31 | 101 | 103 |
| Example 32 | 82 | 86 |
| Example 33 | 98 | 100 |
| Example 34 | 85 | 89 |
| Example 35 | 86 | 89 |
| Example 36 | 83 | 86 |

| | Water-based paint | | |
|---|---|---|---|
| | Gloss reduction percentage (%) | Storage stability (%) | Zeta potential (mV) |
| Example 25 | 8 | 82 | −50.9 |
| Example 26 | 10 | 78 | −47.8 |
| Example 27 | 6 | 90 | −53.6 |
| Example 28 | 8 | 85 | −43.3 |
| Example 29 | 10 | 76 | −37.4 |
| Example 30 | 12 | 72 | −35.6 |
| Example 31 | 1 | 101 | −55.2 |
| Example 32 | 5 | 80 | −41.6 |
| Example 33 | 3 | 95 | −47.6 |
| Example 34 | 3 | 86 | −40.6 |
| Example 35 | 3 | 86 | −41.2 |
| Example 36 | 4 | 81 | −45.2 |

TABLE 6

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Comp. Example 29 | Comp. Example 1 | — | — |
| Comp. Example 30 | Comp. Example 2 | — | — |
| Comp. Example 31 | Comp. Example 3 | — | — |
| Comp. Example 32 | Comp. Example 4 | — | — |
| Comp. Example 33 | Comp. Example 5 | — | — |
| Comp. Example 34 | Comp. Example 6 | — | 0.003 |
| Comp. Example 35 | Comp. Example 7 | — | 0.33 |
| Comp. Example 36 | Comp. Example 8 | — | 0.43 |
| Comp. Example 37 | Comp. Example 9 | — | 0.61 |
| Comp. Example 38 | Comp. Example 10 | — | 1.67 |
| Comp. Example 39 | Comp. Example 11 | — | 0.69 |
| Comp. Example 40 | Comp. Example 12 | — | 0.15 |
| Comp. Example 41 | Comp. Example 13 | — | 0.34 |
| Comp. Example 42 | Comp. Example 14 | 0.41 | — |

TABLE 6-continued

| | Water-based paint Gloss | |
|---|---|---|
| | Mill base dispersion time 45 minutes (%) | Mill base dispersion time 90 minutes (%) |
| Comp. Example 29 | 65 | 73 |
| Comp. Example 30 | 66 | 76 |
| Comp. Example 31 | 58 | 69 |
| Comp. Example 32 | 56 | 73 |
| Comp. Example 33 | 43 | 70 |
| Comp. Example 34 | 67 | 75 |
| Comp. Example 35 | 69 | 74 |
| Comp. Example 36 | 62 | 73 |
| Comp. Example 37 | 64 | 69 |
| Comp. Example 38 | 70 | 78 |
| Comp. Example 39 | 68 | 78 |
| Comp. Example 40 | 58 | 67 |
| Comp. Example 41 | 60 | 70 |
| Comp. Example 42 | 76 | 80 |

| | Water-based paint | | |
|---|---|---|---|
| | Gloss reduction percentage (%) | Storage stability (%) | Zeta potential (mV) |
| Comp. Example 29 | 12 | 60 | −17.8 |
| Comp. Example 30 | 15 | 60 | −17.2 |
| Comp. Example 31 | 12 | 58 | −10.5 |
| Comp. Example 32 | 18 | 46 | −11.2 |
| Comp. Example 33 | 28 | 43 | −7.6 |
| Comp. Example 34 | 10 | 63 | −22.5 |
| Comp. Example 35 | 8 | 63 | −24.6 |
| Comp. Example 36 | 10 | 65 | −19.5 |
| Comp. Example 37 | 17 | 58 | −18.6 |
| Comp. Example 38 | 15 | 68 | −23.2 |
| Comp. Example 39 | 13 | 65 | −21.6 |
| Comp. Example 40 | 18 | 55 | −16.9 |
| Comp. Example 41 | 16 | 62 | −18.6 |
| Comp. Example 42 | 7 | 76 | −29.1 |

Production of inorganic colored particles other than iron oxide-based particles

Example 37

2.5 kg of granular titanium oxide particles having an average diameter of 0.27 μm were mixed in an 85° C. Henschel mixer (10-litre capacity) operated at 1,200 r.p.m. for 10 minutes to remove water, reducing the water content of the titanium oxide particles to 0.13% by weight.

With the above Henschel mixer temperature maintained 95° C., 25 g of a polyether-modified polysiloxane BYK-080 (active ingredient: 100%) (corresponding to 1.0% by weight based on the titanium oxide particles) was added at a rate of 2.5 g/min over a period of 10 minutes, and mixed for 20 minutes to coat the said titanium oxide particle surfaces with the said polyether-modified polysiloxane.

Then the Henschel mixer, with mixing continued, was cooled to room temperature to obtain the titanium oxide particles having their surfaces coated with a polyether-modified polysiloxane.

The obtained titanium oxide particles had a 0.55 wt % coat of the polyether-modified polysiloxane.

Examples 38–42 and Comparative Examples 48–55

The same procedure as in Example 37 was carried out except that the kind, amount and heat treatment temperature of the colored particles, the kind, amount and mixing temperature of the modified polysiloxane were varied to obtain the treated colored particles.

The treating conditions are shown in Tables 7 and 8.

Comparative Examples 43–47

For comparison, there were prepared the non-treated colored particles. The properties of these colored particles are shown in Table 8.

TABLE 7

| Coating treatment Inorganic colored particles | | | |
|---|---|---|---|
| | Kind | Shape | Major axial diameter (μm) |
| Example 37 | Titanium oxide | Granular | 0.27 |
| Example 38 | Titanium oxide | Granular | 0.25 |
| Example 39 | Chrome yellow | Granular | 0.36 |
| Example 40 | Chrome yellow | Granular | 0.33 |
| Example 41 | Chrome oxide | Granular | 0.30 |
| Example 42 | Chrome oxide | Granular | 0.30 |
| Example 43 | Titanium oxide | Granular | 0.27 |
| Example 44 | Titanium oxide | Granular | 0.25 |
| Example 45 | Chrome yellow | Granular | 0.36 |
| Example 46 | Chrome yellow | Granular | 0.33 |
| Example 47 | Chrome oxide | Granular | 0.30 |
| Example 48 | Chrome oxide | Granular | 0.30 |

| Coating treatment Inorganic colored particles | | | |
|---|---|---|---|
| | Minor axial diameter (μm) | BET specific surface area (m²/g) | Amount (kg) |
| Example 37 | — | 11.6 | 2.5 |
| Example 38 | — | 16.5 | 2.5 |
| Example 39 | — | 6.6 | 3.0 |
| Example 40 | — | 9.1 | 3.0 |
| Example 41 | — | 7.3 | 3.0 |
| Example 42 | — | 7.3 | 3.0 |
| Example 43 | — | 11.6 | 2.5 |
| Example 44 | — | 16.5 | 2.5 |
| Example 45 | — | 6.6 | 3.0 |
| Example 46 | — | 9.1 | 3.0 |
| Example 47 | — | 7.3 | 3.0 |
| Example 48 | — | 7.3 | 3.0 |

TABLE 7-continued

| | Coating treatment | | | |
|---|---|---|---|---|
| | Inorganic colored particles Heat treatment | | Squaric acid | |
| | Temp. (°C.) | Residual water content (%) | Kind | Amount added (%) |
| Example 37 | 85 | 0.13 | — | — |
| Example 38 | 85 | 0.08 | — | — |
| Example 39 | 85 | 0.10 | — | — |
| Example 40 | 85 | 0.15 | — | — |
| Example 41 | 85 | 0.08 | — | — |
| Example 42 | 85 | 0.07 | — | — |
| Example 43 | 90 | 0.08 | A | 1.0 |
| Example 44 | 90 | 0.06 | A | 3.0 |
| Example 45 | 85 | 0.12 | A | 5.0 |
| Example 46 | 85 | 0.13 | A | 1.0 |
| Example 47 | 100 | 0.02 | A | 0.5 |
| Example 48 | 100 | 0.02 | A | 1.0 |

| | Coating treatment Specific modified polysiloxane | | |
|---|---|---|---|
| | Kind | Amount added (%) | Mixing temperature (°C.) |
| Example 37 | Polyether-modofoed polysiloxane BYK-080 | 1.0 | 95 |
| Example 38 | Polyether-modified polysiloxane BYK-080 | 2.0 | 95 |
| Example 39 | Polyether-modified polysiloxane BYK-080 | 3.0 | 85 |
| Example 40 | Polyether-modified polysiloxane BYK-080 | 2.0 | 85 |
| Example 41 | Polyester-modified polysiloxane BYK-310 | 0.7 | 100 |
| Example 42 | Aralkyl-modified polysiloxane BYK-322 | 0.5 | 105 |
| Example 43 | Polyether-modified polysiloxane BYK-080 | 5.0 | 85 |
| Example 44 | Polyether-modified polysiloxane BYK-325 | 5.0 | 90 |
| Example 45 | Aralkyl-modified polysiloxane BYK-322 | 7.0 | 100 |
| Example 46 | Polyether-modified polysiloxane BYK-080 | 0.1 | 80 |
| Example 47 | Polyester-modified polysiloxane BYK-310 | 2.0 | 80 |
| Example 48 | Polyether-modified polysiloxane BYK-080 | 1.0 | 90 |

A: 3,4-dihydroxy-3-cyclobutene-1,2-dione (produced by Tokyo Kasei Kogyo CO., LTD.)

TABLE 8

| | Coating treatment Inorganic colored particles | | |
|---|---|---|---|
| | Kind | Shape | Major axial diameter (μm) |
| Comp. Example 43 | Titanium oxide | Granular | 0.27 |
| Comp. Example 44 | Titanium oxide | Granular | 0.25 |
| Comp. Example 45 | Chrome yellow | Granular | 0.36 |
| Comp. Example 46 | Chrome yellow | Granular | 0.33 |
| Comp. Example 47 | Chrome oxide | Granular | 0.30 |
| Comp. Example 48 | Titanium oxide | Granular | 0.27 |
| Comp. Example 49 | Titanium oxide | Granular | 0.27 |
| Comp. Example 50 | Titanium oxide | Granular | 0.27 |
| Comp. Example 51 | Titanium oxide | Granular | 0.27 |
| Comp. Example 52 | Titanium oxide | Granular | 0.27 |
| Comp. Example 53 | Titanium oxide | Granular | 0.27 |
| Comp. Example 54 | Titanium oxide | Granular | 0.27 |
| Comp. Example 55 | Titanium oxide | Granular | 0.27 |
| Comp. Example 56 | Titanium oxide | Granular | 0.27 |

| | Coating treatment Inorganic colored particles | | |
|---|---|---|---|
| | Minor axial diameter (μm) | BET specific surface area (m²/g) | Amount (kg) |
| Comp. Example 43 | — | 11.6 | — |
| Comp. Example 44 | — | 16.5 | — |
| Comp. Example 45 | — | 6.6 | — |
| Comp. Example 46 | — | 9.1 | — |
| Comp. Example 47 | — | 7.3 | — |
| Comp. Example 48 | — | 11.6 | 2.5 |
| Comp. Example 49 | — | 11.6 | 2.5 |
| Comp. Example 50 | — | 11.6 | 2.5 |
| Comp. Example 51 | — | 11.6 | 2.5 |
| Comp. Example 52 | — | 11.6 | 2.5 |
| Comp. Example 53 | — | 11.6 | 2.5 |
| Comp. Example 54 | — | 11.6 | 2.5 |
| Comp. Example 55 | — | 11.6 | 2.5 |
| Comp. Example 56 | — | 11.6 | — |

| | Coating treatment Inorganic colored particles Heat treatment | | Squartic acid | |
|---|---|---|---|---|
| | Temp. (°C.) | Residual water content (%) | Kind | Amount added (%) |
| Comp. Example 43 | — | — | — | — |
| Comp. Example 44 | — | — | — | — |
| Comp. Example 45 | — | — | — | — |
| Comp. Example 46 | — | — | — | — |
| Comp. Example 47 | — | — | — | — |
| Comp. Example 48 | 85 | 0.12 | — | — |

TABLE 8-continued

| | | | | |
|---|---|---|---|---|
| Comp. Example 49 | 85 | 0.13 | — | — |
| Comp. Example 50 | 85 | 0.11 | — | — |
| Comp. Example 51 | 85 | 0.13 | — | — |
| Comp. Example 52 | 85 | 0.13 | — | — |
| Comp. Example 53 | 85 | 0.14 | — | — |
| Comp. Example 54 | 85 | 0.12 | — | — |
| Comp. Example 55 | 85 | 0.12 | — | — |
| Comp. Example 56 | — | — | A | 1.0 |

| | Coating treatment Specific modified polysiloxane | | |
|---|---|---|---|
| | Kind | Amount added (%) | Mixing temperature (°C.) |
| Comp. Example 43 | — | — | — |
| Comp. Example 44 | — | — | — |
| Comp. Example 45 | — | — | — |
| Comp. Example 46 | — | — | — |
| Comp. Example 47 | — | — | — |
| Comp. Example 48 | Polyether-modified polysiloxane BYK-080 | 0.005 | 80 |
| Comp. Example 49 | Polydimethylsiloxane | 1.0 | 85 |
| Comp. Example 50 | Methyl hydrogensiloxane | 2.0 | 85 |
| Comp. Example 51 | Alkoxypolysiloxane | 1.0 | 85 |
| Comp. Example 52 | Methylphenyl-polysiloxane | 4.0 | 95 |
| Comp. Example 53 | Dimethylpolysiloxy chloride | 5.0 | 95 |
| Comp. Example 54 | γ-glycidoxypropyl-trimethoxysilane | 0.5 | 80 |
| Comp. Example 55 | Amino group end modified polysiloxane | 1.0 | 85 |
| Comp. Example 56 | — | — | — |

A: 3,4-dihydroxy-3-cyclobutene-1,2-dione (produced by Tokyo Kasei Kogyo CO., LTD.)

Example 43

A squaric acid solution was prepared by adding 30 g of squaric acid (3,4-dihydroxy-3-cyclobutene-1,2-dione) (available from Tokyo Kasei Kogyo CO., LTD.) to 5 litres of pure water, and water was added to this squaric acid solution to make the total amount 25 litres and stirred well by a stirrer. The squaric acid concentration in the resulting solution was 1.2 g/litre.

3 kg of granular titanium oxide particles having an average diameter of 0.27 μm were added gradually to the said squaric acid solution and mixed with stirring by a homomixer for 30 minutes, followed by filtration, drying and pulverization to obtain the titanium oxide particles coated with squaric acid.

The squaric acid coat of the obtained titanium oxide particles was 0.40% by weight, calculated as C, based on the particles.

2.5 kg of the said squaric acid-coated titanium oxide particles were supplied into a 10-litre Henschel mixer heated to 90° C. and mixed therein at 1,200 r.p.m. for 10 minutes to remove water, thereby reducing the water content of the titanium oxide particles to 0.08% by weight.

With the Henschel mixer temperature maintained at 85° C., 125 g of a polyether-modified polysiloxane BYK-080 (active ingredient: 100%) was added at a rate of 6.25 g/min over a period of 20 minutes, followed by mixing for 20 minutes to coat the said titanium oxide particle surfaces with the said polyether-modified polysiloxane.

Then the Henschel mixer, with mixing continued, was cooled to room temperature to obtain the titanium oxide particles having their surfaces coated with a polyether-modified polysiloxane.

The polyether-modified polysiloxane coat of the obtained titanium oxide particles was 2.56%, calculated as C, based on the particles.

Examples 44–48 & Comparative Example 56

The same procedure as in Example 43 was carried out except that the kind, amount, heat treatment (whether conducted or not) and treatment temperature of the inorganic colored particles, the kind, amount and mixing temperature of the modified polysiloxane, and the kind and mount of squaric acid were varied to obtain the treated inorganic colored particles.

The treating conditions in these Examples are shown in Table 7.

Production of solvent-type paints containing colored particles other than iron oxide-based particles

Example 49

Using 10 g of the titanium oxide particles obtained in Example 37, the following materials were blended in the specified ratios in a 140 ml glass pot, and then mixed and dispersed with 90 g of 3 mmφ glass beads for 45 minutes or 90 minutes to make a mill base:

| | |
|---|---|
| Titanium oxide particles obtained in Example 37 | 12.2 parts by weight |
| Aminoalkyd resin (No. 1026, produced by Kansai Paint Co., Ltd.) | 19.5 parts by weight |
| Thinner | 7.3 parts by weight |

This mill base was blended with the said aminoalkyd resin in the ratios specified below, and further mixed and dispersed for 15 minutes by a paint shaker to obtain a solvent-type paint:

| | |
|---|---|
| Mill base | 39.0 parts by weight |
| Aminoalkyd resin (No. 1026, Kansai Paint Co., Ltd.) | 61.0 parts by weight |

By way of comparison, there was produced a paint by the following the same procedure as Example 49 except that the titanium oxide particles were not coated with the polyether-modified polysiloxane BYK-080 and added in the coating composition in the course of production of the paint (the method same as disclosed in Japanese Patent Application Laid-open (KOKAI) 62-187772). Gloss of the coating film formed by using this paint was 76% when the dispersion time was 45 minutes and 78% when the dispersion time was 90 minutes, with the reduction percentage of gloss being 12%.

Examples 50–60 and Comparative Examples 57–70

The same procedure as in Example 49 was carried out except that the kind of the inorganic colored particles was varied to obtain solvent-type paints.

The properties of the obtained solvent-type paints are shown in Table 9 and Table 10.

TABLE 9

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Example 49 | Example 37 | — | 0.55 |
| Example 50 | Example 38 | — | 1.10 |
| Example 51 | Example 39 | — | 1.58 |
| Example 52 | Example 40 | — | 1.04 |
| Example 53 | Example 41 | — | 0.10 |
| Example 54 | Example 42 | — | 0.30 |
| Example 55 | Example 43 | 0.40 | 2.56 |
| Example 56 | Example 44 | 1.25 | 1.40 |
| Example 58 | Example 45 | 1.97 | 3.61 |
| Example 59 | Example 46 | 0.41 | 0.05 |
| Example 60 | Example 47 | 0.23 | 0.30 |
| Example 61 | Example 48 | 0.42 | 0.55 |

| | Solvent-type paint | | |
|---|---|---|---|
| | Gloss | | |
| | Mill base dispersion time 45 minutes (%) | Mill base dispersion time 90 minutes (%) | Gloss reduction percentage (%) |
| Example 49 | 82 | 86 | 7 |
| Example 50 | 86 | 91 | 4 |
| Example 51 | 78 | 82 | 8 |
| Example 52 | 80 | 85 | 8 |
| Example 53 | 77 | 83 | 9 |
| Example 54 | 78 | 81 | 9 |
| Example 55 | 84 | 88 | 3 |
| Example 56 | 89 | 94 | 1 |
| Example 58 | 83 | 85 | 2 |
| Example 59 | 80 | 84 | 6 |
| Example 60 | 80 | 83 | 10 |
| Example 61 | 83 | 83 | 4 |

TABLE 10

| | Treated iron oxide pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Comp. Example 57 | Comp. Example 43 | — | — |
| Comp. Example 58 | Comp. Example 44 | — | — |
| Comp. Example 59 | Comp. Example 45 | — | — |
| Comp. Example 60 | Comp. Example 46 | — | — |
| Comp. Example 61 | Comp. Example 47 | — | — |
| Comp. Example 62 | Comp. Example 48 | — | 0.003 |
| Comp. Example 63 | Comp. Example 49 | — | 0.32 |
| Comp. Example 64 | Comp. Example 50 | — | 0.43 |
| Comp. Example 65 | Comp. Example 51 | — | 0.60 |
| Comp. Example 66 | Comp. Example 52 | — | 1.71 |
| Comp. Example 67 | Comp. Example 53 | — | 0.71 |
| Comp. Example 68 | Comp. Example 54 | — | 0.14 |
| Comp. Example 69 | Comp. Example 55 | — | 0.33 |
| Comp. Example 70 | Comp. Example 56 | 0.39 | — |

| | Solvent-type paint | | |
|---|---|---|---|
| | Gloss | | |
| | Mill base dispersion time 45 minutes (%) | Mill base dispersion time 90 minutes (%) | Gloss reduction percentage (%) |
| Comp. Example 57 | 73 | 76 | 15 |
| Comp. Example 58 | 75 | 78 | 12 |
| Comp. Example 59 | 69 | 75 | 17 |
| Comp. Example 60 | 72 | 76 | 15 |
| Comp. Example 61 | 66 | 71 | 22 |
| Comp. Example 62 | 76 | 80 | 13 |
| Comp. Example 63 | 75 | 80 | 12 |
| Comp. Example 64 | 73 | 76 | 12 |
| Comp. Example 65 | 76 | 79 | 14 |
| Comp. Example 66 | 75 | 79 | 16 |
| Comp. Example 67 | 68 | 68 | 19 |
| Comp. Example 68 | 70 | 72 | 13 |
| Comp. Example 69 | 76 | 80 | 12 |
| Comp. Example 70 | 75 | 80 | 12 |

Production of water-based paints containing colored particles other than iron oxide-base particles

Example 61

Using 7.62 g of the titanium oxide particles obtained in Example 37, the following materials were blended in the specified ratios in a 140 ml glass pot, and then mixed and dispersed with 90 g of 3 mm$\phi$ glass beads for 45 minutes or 90 minutes by a paint shaker to make a mill base:

| | |
|---|---|
| Titanium oxide particles obtained in Example 37 | 12.4 parts by weight |
| Water-soluble alkyd resin (trade name: S-118, produced by Dai Nippon Ink Chemical Co., Ltd.) | 9.0 parts by weight |
| Defoaming agent (trade name: Nopco 8043, produced by Sannopco Ltd.) | 0.1 part by weight |
| Water | 4.8 parts by weight |

-continued

| | |
|---|---|
| Butyl cellosolve | 4.1 parts by weight |

Using this mill base, the following materials were blended in the specified ratios and then further mixed and dispersed for 15 minutes by a paint shaker to obtain a water-based paint:

| | |
|---|---|
| Mill base | 30.4 parts by weight |
| Water-soluble alkyd resin (trade name: S-118, produced by Dai Nippon Ink Chemical Co., Ltd.) | 46.2 parts by weight |
| Water-soluble melamine resin (trade name: S-695, produced by Dai Nippon Ink Chemical Co., Ltd.) | 12.6 parts by weight |
| Defoaming agent (trade name: Nopco 8034, produced by Sannopco Ltd.) | 0.1 part by weight |
| Water | 9.1 parts by weight |
| Butyl cellosolve | 1.6 part by weight |

For comparison, a paint was produced in the same procedure as Example 61 except that the titanium oxide particles were not coated with the polyether-modified polysiloxane BYK-080 and added in the composition in the course of preparation of the water-based paint (the method same as disclosed in the afore-mentioned Japanese Patent Application Laid-open (KOKAI) 62-187772). Gloss of the coating film formed by using this paint was 64% when the dispersion time was 45 minutes and 73% when the dispersion time was 90 minutes, with the reduction percentage of gloss being 14%.

Examples 62–72 and Comparative Examples 71–84

The same procedure as in Example 61 was carried out except that the kind of the inorganic colored particles was varied to produce water-based paints. The properties of the obtained water-based paints are shown in Table 11 and Table 12.

TABLE 11

| | Treated inorganic colored pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Example 61 | Example 37 | — | 0.55 |
| Example 62 | Example 38 | — | 1.10 |
| Example 63 | Example 39 | — | 1.58 |
| Example 64 | Example 40 | — | 1.04 |
| Example 65 | Example 41 | — | 0.10 |
| Example 66 | Example 42 | — | 0.30 |
| Example 67 | Example 43 | 0.40 | 2.56 |
| Example 68 | Example 44 | 1.25 | 1.40 |
| Example 69 | Example 45 | 1.97 | 3.61 |
| Example 70 | Example 46 | 0.41 | 0.05 |
| Example 71 | Example 47 | 0.23 | 0.30 |
| Example 72 | Example 48 | 0.42 | 0.55 |

TABLE 11-continued

| | Water-based paint Gloss | |
|---|---|---|
| | Mill base dispersion time 45 minutes (%) | Mill base dispersion time 90 minutes (%) |
| Example 61 | 83 | 86 |
| Example 62 | 87 | 91 |
| Example 63 | 81 | 86 |
| Example 64 | 82 | 88 |
| Example 65 | 76 | 80 |
| Example 66 | 78 | 82 |
| Example 67 | 86 | 93 |
| Example 68 | 90 | 96 |
| Example 69 | 86 | 89 |
| Example 70 | 82 | 88 |
| Example 71 | 80 | 85 |
| Example 72 | 85 | 89 |

| | Water-based paint | | |
|---|---|---|---|
| | Gloss reduction percentage (%) | Storage stability (%) | Zeta potential (mV) |
| Example 61 | 8 | 76 | −46.1 |
| Example 62 | 5 | 83 | −50.6 |
| Example 63 | 7 | 77 | −46.2 |
| Example 64 | 6 | 79 | −53.6 |
| Example 65 | 10 | 72 | −35.2 |
| Example 66 | 10 | 78 | −33.1 |
| Example 67 | 5 | 81 | −48.6 |
| Example 68 | 3 | 93 | −54.6 |
| Example 69 | 5 | 86 | −53.0 |
| Example 70 | 5 | 80 | −50.0 |
| Example 71 | 8 | 80 | −42.1 |
| Example 72 | 8 | 86 | −41.6 |

TABLE 12

| | Treated inorganic colored pigment particles | | |
|---|---|---|---|
| | Kind of iron oxide pigment particles | Coating weight of squaric acid, calcd. as C (wt %) | Coating weight of modified polysiloxane, calcd. as C (wt %) |
| Comp. Example 71 | Comp. Example 43 | — | — |
| Comp. Example 72 | Comp. Example 44 | — | — |
| Comp. Example 73 | Comp. Example 45 | — | — |
| Comp. Example 74 | Comp. Example 46 | — | — |
| Comp. Example 75 | Comp. Example 47 | — | — |
| Comp. Example 76 | Comp. Example 48 | — | 0.003 |
| Comp. Example 77 | Comp. Example 49 | — | 0.32 |
| Comp. Example 78 | Comp. Example 50 | — | 0.43 |
| Comp. Example 79 | Comp. Example 51 | — | 0.60 |
| Comp. Example 80 | Comp. Example 52 | — | 1.71 |
| Comp. Example 81 | Comp. Example 53 | — | 0.71 |
| Comp. Example 82 | Comp. Example 54 | — | 0.14 |
| Comp. Example 83 | Comp. Example 55 | — | 0.33 |

TABLE 12-continued

| | | 0.39 | — |
|---|---|---|---|
| Comp. Example 84 | Comp. Example 56 | | |

| | Water-based paint Gloss | |
|---|---|---|
| | Mill base dispersion time 45 minutes (%) | Mill base dispersion time 90 minutes (%) |
| Comp. Example 71 | 59 | 67 |
| Comp. Example 72 | 68 | 74 |
| Comp. Example 73 | 63 | 70 |
| Comp. Example 74 | 63 | 72 |
| Comp. Example 75 | 38 | 51 |
| Comp. Example 76 | 66 | 72 |
| Comp. Example 77 | 65 | 73 |
| Comp. Example 78 | 63 | 69 |
| Comp. Example 79 | 59 | 66 |
| Comp. Example 80 | 65 | 70 |
| Comp. Example 81 | 63 | 68 |
| Comp. Example 82 | 45 | 61 |
| Comp. Example 83 | 68 | 72 |
| Comp. Example 84 | 73 | 78 |

| | Water-based paint | | |
|---|---|---|---|
| | Gloss reduction percentage (%) | Storage stability (%) | Zeta potential (mV) |
| Comp. Example 71 | 19 | 65 | −21.6 |
| Comp. Example 72 | 15 | 70 | −23.8 |
| Comp. Example 73 | 16 | 65 | −13.8 |
| Comp. Example 74 | 15 | 68 | −15.6 |
| Comp. Example 75 | 26 | 40 | −6.5 |
| Comp. Example 76 | 15 | 70 | −24.8 |
| Comp. Example 77 | 17 | 68 | −20.0 |
| Comp. Example 78 | 20 | 63 | −10.6 |
| Comp. Example 79 | 21 | 60 | −11.3 |
| Comp. Example 80 | 15 | 60 | −21.6 |
| Comp. Example 81 | 18 | 63 | −15.0 |
| Comp. Example 82 | 19 | 52 | −18.2 |
| Comp. Example 83 | 15 | 68 | −21.3 |
| Comp. Example 84 | 13 | 72 | −29.6 |

Production of magnetic particles

Example 73

3.0 kg of granular barium ferrite particles having an average diameter of 0.65 μm, a BET specific surface area of 4.6 m²/g, a coercive force Hc of 2,753 Oe, a saturation magnetization $\sigma_s$ of 55.6 emu/g, a pH value of 9.5 and a water content of 0.17% by weight were mixed in an 85° C. Henschel mixer (10-litre capacity) operated at 1,200 r.p.m. for 10 minutes to reduce the water content of the barium ferrite particles to 0.06% by weight.

With the Henschel mixer temperature maintained at 85° C., 30 g of a polyether-modified polysiloxane BYK-080 (trade name, produced by BYK Chemie Co., Ltd.) (active ingredient: 100%) (corresponding to 1.0% by weight based on barium ferrite particles) was added at a rate of 3.0 g/min over a period of 10 minutes and mixed for 20 minutes to coat the barium ferrite particle surfaces with the said polyether-modified polysiloxane.

Then the Henschel mixer, with mixing continued, was cooled to room temperature to obtain the barium ferrite particles having their surfaces coated with a polyether-modified polysiloxane.

The polyether-modified polysiloxane coat of the obtained barium ferrite particles was 0.52% by weight, calculated as C, based on the particles.

Examples 74–78 and Comparative Examples 90–98

The same procedure as in Example 73 was carried out except that the type, amount and heat treatment temperature of the magnetic particles, the kind, amount of squaric acid, the type, amount and mixing temperature of the modified polysiloxane were varied to obtain magnetic particles. The treating conditions are shown in Table 13 and Table 14.

Comparative Examples 85–89

By way of comparison, there were prepared the non-treated magnetic particles. The properties of these magnetic particles are shown in Table 14.

Example 79

A squaric acid solution was prepared by adding 35 g of squaric acid (3,4-dihydroxy-3-cyclobutene-1,2-dione) (available from Tokyo Kasei Kogyo CO., LTD.) to 5 litres of pure water, and water was added to this squaric acid solution to make the total amount 35 litres and stirred well. The squaric acid concentration in the resulting solution was 1.0 g/l.

To this squaric acid solution were gradually added 3.5 kg of granular barium ferrite particles having an average diameter of 0.65 μm, a BET specific surface area of 4.6 m2/g, a coercive force Hc of 2,753 Oe, a saturation magnetization $\sigma_s$ of 55.6 emu/g, a pH value of 9.5 and a water content of 0.17% by weight, and the suspension was mixed with stirring by a homomixer for 30 minutes, followed by filtration, drying and pulverization to coat the said barium ferrite particle surfaces with squaric acid.

The obtained barium ferrite particles had a squaric acid coat of 0.40% by weight, calculated as C, based on the particles.

3.0 kg of the said squaric acid-coated barium ferrite particles were mixed in a 85° C. 10-litre Henschel mixer operated at 1,200 r.p.m. for 10 minutes to reduce the water content of the barium ferrite particles to 0.03% by weight.

With the Henschel mixer temperature maintained at 85° C., 60 g of a polyether-modified polysiloxane BYK-080

(active ingredient: 100%) was added at a rate of 3.0 g/min over a period of 20 minutes, followed by mixing for 20 minutes to coat the barium ferrite particle surfaces with the said polyether-modified polysiloxane.

Then the Henschel mixer, with mixing continued, was cooled to room temperature to obtain the barium ferrite particles having a squaric acid coat on which a polyether-modified polysiloxane coat was formed.

The polyether-modified polysiloxane coat of the obtained barium ferrite particles was 1.05% by weight, calculated as C, based on the particles.

Examples 80–84

The same procedure as in Example 79 was carried out except that the kind, amount, heat treatment (conducted or not) and treatment temperature of the magnetic particles, and the kind, the amount of squaric acid, the amount and mixing temperature of the modified polysiloxane were varied to obtain the treated magnetic particles. The treating conditions and the properties of the obtained magnetic particles are shown in Table 13.

TABLE 13

| | Coating treatment Magnetoplumbite ferrite particles or magnetic iron oxide particles | | |
|---|---|---|---|
| | Kind | Shape | Major axial diameter (μm) |
| Example 73 | Barium ferrite | Granular | 0.65 |
| Example 74 | Barium ferrite | Granular | 0.65 |
| Example 75 | Barium ferrite | Granular | 0.68 |
| Example 76 | Strontium ferrite | Granular | 0.70 |
| Example 77 | Maghemite | Acicular | 0.40 |
| Example 78 | Magnetite | Acicular | 0.42 |
| Example 79 | Barium ferrite | Granular | 0.65 |
| Example 80 | Barium ferrite | Granular | 0.65 |
| Example 81 | Barium ferrite | Granular | 0.68 |
| Example 82 | Strontium ferrite | Granular | 0.70 |
| Example 83 | Maghemite | Acicular | 0.40 |
| Example 84 | Magnetite | Acicular | 0.42 |

| | Coating treatment Magnetoplumbite ferrite particles or magnetic iron oxide particles | | |
|---|---|---|---|
| | Minor axial diameter (μm) | BET Specific surface area (m²/g) | Hc (Oe) |
| Example 73 | — | 4.6 | 2753 |
| Example 74 | — | 4.6 | 2753 |
| Example 75 | — | 4.3 | 1768 |
| Example 76 | — | 3.8 | 2560 |
| Example 77 | 0.050 | 16.4 | 310 |
| Example 78 | 0.052 | 14.8 | 334 |
| Example 79 | — | 4.6 | 2753 |
| Example 80 | — | 4.6 | 2753 |
| Example 81 | — | 4.3 | 1768 |
| Example 82 | — | 3.8 | 2560 |
| Example 83 | 0.050 | 16.4 | 310 |
| Example 84 | 0.052 | 14.8 | 334 |

TABLE 13-continued

| | Coating treatment Magnetoplumbite ferrite particles or magnetic iron oxide particles | | |
|---|---|---|---|
| | σs (emu/g) | Amount (kg) | Heat treatment Temp. (°C.) |
| Example 73 | 55.6 | 3.0 | 85 |
| Example 74 | 55.6 | 3.0 | 85 |
| Example 75 | 56.2 | 3.0 | 90 |
| Example 76 | 53.9 | 3.0 | 100 |
| Example 77 | 75.8 | 2.5 | 110 |
| Example 78 | 81.6 | 2.5 | 80 |
| Example 79 | 55.6 | 3.0 | 85 |
| Example 80 | 55.6 | 3.0 | 85 |
| Example 81 | 56.2 | 3.0 | 120 |
| Example 82 | 53.9 | 3.0 | 100 |
| Example 83 | 75.8 | 2.5 | 85 |
| Example 84 | 81.6 | 2.5 | 80 |

| | Coating treatment | | |
|---|---|---|---|
| | Magnetoplumbite ferrite particles or magnetic iron oxide particles Heat treatment | Squaric acid | |
| | Residual water content (%) | Kind | Amount added (%) |
| Example 73 | 0.06 | — | — |
| Example 74 | 0.05 | — | — |
| Example 75 | 0.03 | — | — |
| Example 76 | 0 | — | — |
| Example 77 | 0.02 | — | — |
| Example 78 | 0.08 | — | — |
| Example 79 | 0.03 | A | 1.0 |
| Example 80 | 0.05 | A | 3.0 |
| Example 81 | 0 | A | 5.0 |
| Example 82 | 0.02 | A | 1.0 |
| Example 83 | 0.05 | A | 0.5 |
| Example 84 | 0.09 | A | 1.0 |

| | Coating treatment Specific modified polysiloxane | | |
|---|---|---|---|
| | Kind | Amount added (%) | Mixing temperature (°C.) |
| Example 73 | Polyether-modified polysiloxane BYK-080 | 1.0 | 85 |
| Example 74 | Polyether-modified polysiloxane BYK-080 | 0.5 | 85 |
| Example 75 | Polyether-modified polysiloxane BYK-080 | 2.0 | 90 |
| Example 76 | Polyether-modified polysiloxane BYK-325 | 5.0 | 100 |
| Example 77 | Polyester-modified polysiloxane BYK-310 | 3.0 | 105 |
| Example 78 | Aralkyl-modified polysiloxane BYK-322 | 3.5 | 85 |
| Example 79 | Polyether-modified polysiloxane BYK-080 | 2.0 | 85 |
| Example 80 | Aralkyl-modified polysiloxane BYK-322 | 0.1 | 90 |
| Example 81 | Polyether-modified polysiloxane BYK-320 | 8.0 | 110 |
| Example 82 | Polyester-modified polysiloxane BYK-310 | 1.0 | 100 |
| Example 83 | Polyether-modified polysiloxane BYK-080 | 3.0 | 85 |
| Example 84 | Polyether-modified polysiloxane BYK-080 | 1.0 | 80 |

A: 3,4-dihydroxy-3-cyclobutene-1,2-dione (produced by Tokyo Kasei Kogyo CO., LTD.)

TABLE 14

| | Coating treatment Magnetoplumbite ferrite particles or magnetic iron oxide particles | | | | | |
|---|---|---|---|---|---|---|
| | Kind | Shape | Major axial diameter (μm) | Minor axial diameter (μm) | BET Specific surface area (m²/g) | Hc (Oe) |
| Comp. Example 85 | Barium ferrite | Granular | 0.65 | — | 4.6 | 2753 |
| Comp. Example 86 | Barium ferrite | Granular | 0.68 | — | 4.3 | 1768 |
| Comp. Example 87 | Strontium ferrite | Granular | 0.70 | — | 3.8 | 2560 |
| Comp. Example 88 | Maghemite | Acicular | 0.40 | 0.050 | 16.4 | 310 |
| Comp. Example 89 | Magnetite | Acicular | 0.42 | 0.052 | 14.8 | 334 |
| Comp. Example 90 | Barium ferrite | Granular | 0.65 | — | 4.6 | 2753 |
| Comp. Example 91 | Barium ferrite | Granular | 0.65 | — | 4.6 | 2753 |
| Comp. Example 92 | Barium ferrite | Granular | 0.65 | — | 4.6 | 2753 |
| Comp. Example 93 | Barium ferrite | Granular | 0.65 | — | 4.6 | 2753 |
| Comp. Example 94 | Barium ferrite | Granular | 0.65 | — | 4.6 | 2753 |
| Comp. Example 95 | Barium ferrite | Granular | 0.65 | — | 4.6 | 2753 |
| Comp. Example 96 | Barium ferrite | Granular | 0.65 | — | 4.6 | 2753 |
| Comp. Example 97 | Barium ferrite | Granular | 0.65 | — | 4.6 | 2753 |
| Comp. Example 98 | Barium ferrite | Granular | 0.65 | — | 4.6 | 2753 |

| | Coating treatment Magnetoplumbite ferrite particles or magnetic iron oxide particles | | | Magnetoplumbite ferrite particles or magnetic iron oxide particles Heat treatment Residual water content (%) | Squaric acid | |
|---|---|---|---|---|---|---|
| | σs (emu/g) | Amount (kg) | Heat treatment Temp. (°C.) | | Kind | Amount added (%) |
| Comp. Example 85 | 55.6 | 3.0 | — | — | — | — |
| Comp. Example 86 | 56.2 | 3.0 | — | — | — | — |
| Comp. Example 87 | 53.9 | 3.0 | — | — | — | — |
| Comp. Example 88 | 75.8 | 2.5 | — | — | — | — |
| Comp. Example 89 | 81.6 | 2.5 | — | — | — | — |
| Comp. Example 90 | 55.6 | 3.0 | 85 | 0.06 | — | — |
| Comp. Example 91 | 55.6 | 3.0 | 85 | 0.06 | — | — |
| Comp. Example 92 | 55.6 | 3.0 | 85 | 0.07 | — | — |
| Comp. Example 93 | 55.6 | 3.0 | 85 | 0.06 | — | — |
| Comp. Example 94 | 55.6 | 3.0 | 85 | 0.06 | — | — |
| Comp. Example 95 | 55.6 | 3.0 | 85 | 0.07 | — | — |
| Comp. Example 96 | 55.6 | 3.0 | 85 | 0.06 | — | — |
| Comp. Example 97 | 55.6 | 3.0 | 85 | 0.06 | — | — |
| Comp. Example 98 | 55.6 | 3.0 | — | — | A | 0.25 |

TABLE 14-continued

Coating treatment
Specific modified polysiloxane

| | Kind | Amount added (%) | Mixing temperature (°C.) |
|---|---|---|---|
| Comp. Example 85 | — | — | — |
| Comp. Example 86 | — | — | — |
| Comp. Example 87 | — | — | — |
| Comp. Example 88 | — | — | — |
| Comp. Example 89 | — | — | — |
| Comp. Example 90 | Polyether-modified polysiloxane BYK-080 | 0.005 | 90 |
| Comp. Example 91 | Polydimethylsiloxane | 1.0 | 85 |
| Comp. Example 92 | Methylhydrogensiloxane | 2.0 | 85 |
| Comp. Example 93 | Alkoxypolysiloxane | 1.0 | 85 |
| Comp. Example 94 | Methyphenylpolysiloxane | 4.0 | 85 |
| Comp. Example 95 | Dimethylpolysiloxychloride | 5.0 | 85 |
| Comp. Example 96 | γ-glycidoxypropyl-trimethoxysilane | 0.5 | 80 |
| Comp. Example 97 | Amino group end modified polysiloxane | 1.0 | 80 |
| Comp. Example 98 | — | — | — |

Production of solvent-type paints

Example 85

Using 18 g of the treated magnetic particles obtained in Example 73, they were blended with a lecithin solution in the specified ratios in a 140 ml glass pot and then mixed and dispersed with 100 g of 1.5 mmφ glass beads for 15 minutes by a paint shaker to obtain a mill base (1). Mill base (1) composition:

| Treated magnetic particles obtained in Example 73 | 37.5 parts by weight |
|---|---|
| Lecithin solution (2.5 wt % cyclohexanone solution) | 7.5 parts by weight |

Using this mill base (1), the following materials were blended in the specified ratios and further mixed and dispersed by a paint shaker to obtain a mill base (2). There were prepared two types of mill base (2), one being prepared with a dispersion time of 60 minutes and the other with a dispersion time of 120 minutes. Mill base (2) composition:

| Mill base (1) | 45.0 parts by weight |
|---|---|
| Vinyl chloride-vinyl acetate copolymer resin solution (30 wt % cyclohexanone solution of VAGF, produced by Union Carbide Corp.) | 12.5 parts by weight |
| Methyl ethyl ketone | 16.3 parts by weight |

Using the thus obtained mill base (2), the following materials were blended in the specified ratios and further mixed and dispersed for 30 minutes by a paint shaker to obtain a solvent-type paint.

Solvent-type paint composition

| Mill base (2) | 73.8 parts by weight |
|---|---|
| Polyurethane resin solution (30 wt % methyl ethyl ketone/toluene (1/1) solution of NIPPORAN 2301 available from Nippon Polyurethane Industry Co., Ltd.) | 12.5 parts by weight |
| Methyl ethyl ketone | 3.4 parts by weight |
| Cyclohexanone | 10.3 parts by weight |

The thus obtained solvent-type paint was filtered by a stainless steel mesh with an opening size of 44 µm, then coated on a PET base film to a thickness of 50 µm, oriented in a 2,800 G orienting magnetic field and dried to form a coating film. The properties of this coating film are show in Table 15 and Table 16.

By way of comparison, a paint was produced by following the procedure of Example 85 except that the barium ferrite particles were not coated with the polyether-modified polysiloxane BYK-080 and added in the coating composition in the course of production of the solvent-type paint (the method same as disclosed in the afore-mentioned JAPANESE PATENT APPLICATION LAID-OPEN (KOKAI) 62-187772). The coating film formed with this paint using the mill base (2) prepared with dispersion time of 120 minutes had a coercive force Hc of 2,703 Oe, RS of 0.85, Ra of 0.47 µm, RMS of 0.56 µm and Ra changing percentage after dilution of 11.4%.

Examples 86–96 and Comparative Examples 99–112

The same procedure as in Example 85 was carried out except for variation of the kind of the magnetic particles used to produce solvent-type paints. The properties of the obtained solvent-type paints are shown in Table 15 and Table 16.

TABLE 15

| | Treated magnetic particles | | |
|---|---|---|---|
| | Kind of magnetic particles | Coating weight of squaric acid, calcd. as C (wt %) | Coating weight of modified polysiloxane, calcd. as C (wt %) |
| Example 85 | Example 73 | — | 0.52 |
| Example 86 | Example 74 | — | 0.27 |
| Example 87 | Example 75 | — | 1.08 |
| Example 88 | Example 76 | — | 1.43 |
| Example 89 | Example 77 | — | 0.40 |
| Example 90 | Example 78 | — | 1.83 |
| Example 91 | Example 79 | 0.40 | 1.05 |
| Example 92 | Example 80 | 1.19 | 0.06 |
| Example 93 | Example 81 | 1.98 | 2.30 |
| Example 94 | Example 82 | 0.39 | 0.15 |
| Example 95 | Example 83 | 0.20 | 1.66 |
| Example 96 | Example 84 | 0.39 | 0.54 |

Properties of the coating using solvent-type paint
When using mill base (2) prepared with dispersion time of 60 minutes

| | Hc (Oe) | RS (—) | Ra (µm) |
|---|---|---|---|
| Example 85 | 2713 | 0.90 | 0.32 |
| Example 86 | 2726 | 0.91 | 0.31 |

TABLE 15-continued

| | | | |
|---|---|---|---|
| Example 87 | 1750 | 0.91 | 0.29 |
| Example 88 | 2516 | 0.90 | 0.35 |
| Example 89 | 350 | 0.88 | 0.27 |
| Example 90 | 373 | 0.87 | 0.28 |
| Example 91 | 2710 | 0.91 | 0.28 |
| Example 92 | 2731 | 0.91 | 0.35 |
| Example 93 | 1756 | 0.92 | 0.26 |
| Example 94 | 2530 | 0.91 | 0.34 |
| Example 95 | 354 | 0.89 | 0.30 |
| Example 96 | 368 | 0.89 | 0.30 |

| | Properties of the coating using solvent-type paint | | |
|---|---|---|---|
| | When using mill base (2) prepared with dispersion time of 60 minutes | When using mill base (2) prepared with dispersion time of 120 minutes | |
| | RMS (µm) | Hc (Oe) | RS (−) |
| Example 85 | 0.38 | 2720 | 0.91 |
| Example 86 | 0.38 | 2725 | 0.92 |
| Example 87 | 0.36 | 1746 | 0.92 |
| Example 88 | 0.42 | 2510 | 0.92 |
| Example 89 | 0.33 | 355 | 0.88 |
| Example 90 | 0.34 | 372 | 0.88 |
| Example 91 | 0.33 | 2716 | 0.92 |
| Example 92 | 0.42 | 2721 | 0.92 |
| Example 93 | 0.34 | 1748 | 0.92 |
| Example 94 | 0.38 | 2514 | 0.93 |
| Example 95 | 0.38 | 351 | 0.89 |
| Example 96 | 0.37 | 370 | 0.89 |

| | Properties of the coating using solvent-type paint | | |
|---|---|---|---|
| | When using mill base (2) prepared with dispersion time of 120 minutes | | Dispersion stability (Ra change rate after dilution) (%) |
| | Ra (µm) | RMS (µm) | |
| Example 85 | 0.30 | 0.36 | 6.3 |
| Example 86 | 0.30 | 0.35 | 8.3 |
| Example 87 | 0.26 | 0.32 | 4.6 |
| Example 88 | 0.32 | 0.38 | 7.1 |
| Example 89 | 0.25 | 0.31 | 5.6 |
| Example 90 | 0.25 | 0.30 | 2.7 |
| Example 91 | 0.24 | 0.30 | 4.3 |
| Example 92 | 0.33 | 0.39 | 5.6 |
| Example 93 | 0.23 | 0.29 | 2.6 |
| Example 94 | 0.31 | 0.35 | 7.2 |
| Example 95 | 0.26 | 0.31 | 3.8 |
| Example 96 | 0.24 | 0.30 | 6.6 |

TABLE 16

| | Treated magnetic particles | | |
|---|---|---|---|
| | Kind of magnetic particles | Coating weight of squaric acid, calcd. as C (wt %) | Coating weight of modified polysiloxane, calcd. as C (wt %) |
| Comp. Example 99 | Comp. Example 85 | — | — |
| Comp. Example 100 | Comp. Example 86 | — | — |
| Comp. Example 101 | Comp. Example 87 | — | — |
| CFomp. Example 102 | Comp. Example 88 | — | — |
| Comp. Example 103 | Comp. Example 89 | — | 0.003 |
| Comp. Example 104 | Comp. Example 90 | — | 0.32 |
| Comp. Example 105 | Comp. Example 91 | — | 0.41 |
| Comp. Example 106 | Comp. Example 92 | — | 0.60 |
| Comp. Example 107 | Comp. Example 93 | — | 1.69 |
| Comp. Example 108 | Comp. Example 94 | — | 0.78 |
| Comp. Example 109 | Comp. Example 95 | — | 0.15 |
| Comp. Example 110 | Comp. Example 96 | — | 0.31 |
| Comp. Example 111 | Comp. Example 97 | 0.11 | — |
| Comp. Example 112 | Comp. Example 98 | | |

| | Properties of the coating using solvent-type paint | | |
|---|---|---|---|
| | When using mill base (2) prepared with dispersion time of 60 minutes | | |
| | Hc (Oe) | RS (−) | Ra (µm) |
| Comp. Example 99 | 2703 | 0.82 | 0.49 |
| Comp. Example 100 | 1731 | 0.81 | 0.48 |
| Comp. Example 101 | 2501 | 0.77 | 0.48 |
| Comp. Example 102 | 321 | 0.75 | 0.38 |
| Comp. Example 103 | 339 | 0.73 | 0.38 |
| Comp. Example 104 | 2715 | 0.84 | 0.47 |
| Comp. Example 105 | 2703 | 0.83 | 0.45 |
| Comp. Example 106 | 2716 | 0.83 | 0.42 |
| Comp. Example 107 | 2717 | 0.83 | 0.40 |
| Comp. Example 108 | 2726 | 0.85 | 0.38 |
| Comp. Example 109 | 2715 | 0.83 | 0.40 |
| comp. Example 110 | 2689 | 0.83 | 0.43 |
| Comp. Example 111 | 2698 | 0.84 | 0.48 |
| Comp. Example 112 | 2698 | 0.86 | 0.40 |

| | Properties of the coating using solvent-type paint | | |
|---|---|---|---|
| | When using mill base (2) prepared with dispersion time of 60 minutes | When using mill base (2) prepared with dispersion time of 120 minutes | |
| | RMS (µm) | Hc (Oe) | RS (−) |
| Comp. Example 99 | 0.58 | 2696 | 0.85 |
| Comp. Example 100 | 0.59 | 1724 | 0.83 |
| Comp. Example 101 | 0.58 | 2516 | 0.79 |
| Comp. Example 102 | 0.47 | 325 | 0.81 |
| Comp. Example 103 | 0.46 | 346 | 0.79 |
| Comp. | 0.56 | 2709 | 0.85 |

TABLE 16-continued

| | Ra (μm) | RMS | |
|---|---|---|---|
| Example 104 Comp. | 0.54 | 2712 | 0.86 |
| Example 105 Comp. | 0.52 | 2731 | 0.86 |
| Example 106 Comp. | 0.47 | 2713 | 0.85 |
| Example 107 Comp. | 0.45 | 2726 | 0.87 |
| Example 108 Comp. | 0.48 | 2713 | 0.85 |
| Example 109 Comp. | 0.53 | 2706 | 0.83 |
| Example 110 Comp. | 0.56 | 2721 | 0.87 |
| Example 111 Comp. | 0.48 | 2715 | 0.87 |
| Example 112 | | | |

| | Properties of the coating using solvent-type paint | | |
|---|---|---|---|
| | When using mill base (2) prepared with dispersion time of 120 minutes | | Dispersion stability (Ra change rate after dilution) (%) |
| | Ra (μm) | RMS (μm) | |
| Comp. Example 99 | 0.45 | 0.54 | 16.8 |
| Comp. Example 100 | 0.45 | 0.52 | 12.9 |
| Comp. Example 101 | 0.46 | 0.51 | 20.5 |
| Comp. Example 102 | 0.36 | 0.43 | 9.3 |
| Comp. Example 103 | 0.36 | 0.41 | 9.0 |
| Comp. Example 104 | 0.42 | 0.50 | 13.6 |
| Comp. Example 105 | 0.41 | 0.51 | 13.2 |
| Comp. Example 106 | 0.39 | 0.47 | 11.6 |
| Comp. Example 107 | 0.39 | 0.49 | 15.2 |
| Comp. Example 108 | 0.37 | 0.47 | 11.6 |
| Comp. Example 109 | 0.40 | 0.48 | 13.8 |
| Comp. Example 110 | 0.41 | 0.48 | 19.6 |
| Comp. Example 111 | 0.41 | 0.48 | 17.3 |
| Comp. Example 112 | 0.38 | 0.46 | 12.5 |

Production of water-based paints

Example 97

Using 20.0 g of barium ferrite particles obtained in Example 73, the following materials were blended in the specified ratios in a 140 ml glass pot and mixed and dispersed with 100 g of 1.5 mmφ glass beads by a paint shaker to make a mill base. There were prepared two types of mill base, one prepared with a dispersion time of 30 minutes and the other with a dispersion time of 60 minutes. Mill base composition:

| | |
|---|---|
| Barium ferrite particles obtained in Example 73 | 44.4 parts by weight |
| Dispersing agent (trade name: POIZ 521 (40% aqueous solution) produced by Kao Corp.) | 0.5 part by weight |
| Defoaming agent (trade name: Nopco 8034, produced by Sannopco Ltd.) | 0.3 part by weight |
| Water | 18.4 parts by weight |
| Butyl cellosolve | 7.9 parts by weight |

The mill base was blended with a water-soluble acrylic emulsion specified below in the ratios shown below, and mixed and dispersed for 15 minutes by a paint shaker to obtain a water-based paint.

Water-based paint composition:

| | |
|---|---|
| Mill base | 71.5 parts by weight |
| Water-soluble acrylic emulsion (35 wt %) (trade name: SW-135 produced by Sanyo Chemical Co., Ltd.) | 28.5 parts by weight |

The obtained water-based paint was filtered through a stainless steel mesh with an opening size of 44 μm, then coated on a paper-made base film to a thickness of 50 μm, oriented in a 3,200 G orienting magnetic field and dried to form a coating film. The properties of the formed coating film are shown in Table 17.

By way of comparison, a water-based paint was produced in the same way as Example 97 except that the polyether-modified polysiloxane BYK-080 was not coated on the ferrite particles and these uncoated particles were added in the coating composition in the course of preparation of the water-based paint (the method same as disclosed in the afore-mentioned Japanese Patent Application Laid-open (KOKAI) 62-187772). The coating film formed by using this paint, with the mill base used therein being the type prepared with a dispersion time of 60 minutes, showed a coercive force Hc of 2,710 Oe, RS of 0.83, Ra of 0.42 μm, RMS of 0.50 μm, Ra changing percentage after dilution of 18.6%, and Ra during storage of 0.56 μm. Zeta potential of the particles in the paint was −21.6 mV.

Example 98–108 and Comparative Examples 113–126

The same procedure as in Example 97 was carried out except for variation of the kind of the magnetic particles used to produce water-based paints. The properties of the obtained water-based paint are shown in Table 17 and Table 18.

TABLE 17

| | Treated magnetic particles | | |
|---|---|---|---|
| | Kind of magnetic particles | Coating weight of squaric acid, calcd. as C (wt %) | Coating weight of modified polysiloxane, calcd. as C (wt %) |
| Example 97 | Example 73 | — | 0.52 |
| Example 98 | Example 74 | — | 0.27 |
| Example 99 | Example 75 | — | 1.08 |
| Example 100 | Example 76 | — | 1.43 |
| Example 101 | Example 77 | — | 0.40 |
| Example 102 | Example 78 | — | 1.83 |
| Example 103 | Example 79 | 0.40 | 1.05 |
| Example 104 | Example 80 | 1.19 | 0.06 |
| Example 105 | Example 81 | 1.98 | 2.30 |

TABLE 17-continued

| | | | |
|---|---|---|---|
| Example 106 | Example 82 | 0.39 | 0.15 |
| Example 107 | Example 83 | 0.20 | 1.66 |
| Example 108 | Example 84 | 0.39 | 0.54 |

Properties of the coating using water-based paint
When using mill base prepared with dispersion time of 30 minutes

| | Hc (Oe) | RS (—) | Ra (μm) | RMS (μm) |
|---|---|---|---|---|
| Example 97 | 2730 | 0.91 | 0.28 | 0.33 |
| Example 98 | 2741 | 0.91 | 0.28 | 0.34 |
| Example 99 | 1753 | 0.92 | 0.26 | 0.30 |
| Example 100 | 2555 | 0.90 | 0.30 | 0.35 |
| Example 101 | 348 | 0.88 | 0.22 | 0.28 |
| Example 102 | 372 | 0.88 | 0.24 | 0.29 |
| Example 103 | 2742 | 0.90 | 0.26 | 0.31 |
| Example 104 | 2746 | 0.90 | 0.28 | 0.31 |
| Example 105 | 1740 | 0.92 | 0.22 | 0.25 |
| Example 106 | 2560 | 0.90 | 0.28 | 0.32 |
| Example 107 | 349 | 0.89 | 0.25 | 0.28 |
| Example 108 | 375 | 0.88 | 0.25 | 0.29 |

Properties of the coating using water-based paint
When using mill base prepared with dispersion time of 60 minutes

| | Hc (Oe) | RS (—) | Ra (μm) | RMS (μm) |
|---|---|---|---|---|
| Example 97 | 2726 | 0.91 | 0.24 | 0.28 |
| Example 98 | 2746 | 0.92 | 0.26 | 0.30 |
| Example 99 | 1732 | 0.92 | 0.22 | 0.26 |
| Example 100 | 2546 | 0.91 | 0.26 | 0.29 |
| Example 101 | 358 | 0.91 | 0.20 | 0.24 |
| Example 102 | 381 | 0.89 | 0.20 | 0.25 |
| Example 103 | 2738 | 0.91 | 0.24 | 0.26 |
| Example 104 | 2749 | 0.92 | 0.25 | 0.28 |
| Example 105 | 1738 | 0.94 | 0.21 | 0.24 |
| Example 106 | 2556 | 0.92 | 0.26 | 0.29 |
| Example 107 | 357 | 0.91 | 0.23 | 0.26 |
| Example 108 | 381 | 0.90 | 0.22 | 0.26 |

Properties of the coating using water-based paint

| | Dispersion stability (Ra change rate after dilution) (%) | Storage stability (Ra during storage) (μm) | Zeta potential (mV) |
|---|---|---|---|
| Example 97 | 8.3 | 0.25 | −51.5 |
| Example 98 | 9.2 | 0.28 | −46.6 |
| Example 99 | 6.8 | 0.22 | −69.3 |
| Example 100 | 9.6 | 0.28 | −52.5 |
| Example 101 | 8.8 | 0.24 | −46.6 |
| Example 102 | 9.0 | 0.24 | −53.2 |
| Example 103 | 5.6 | 0.26 | −80.6 |
| Example 104 | 7.8 | 0.29 | −58.6 |
| Example 105 | 3.8 | 0.21 | −83.2 |
| Example 106 | 7.8 | 0.28 | −47.9 |
| Example 107 | 4.2 | 0.24 | −51.5 |
| Example 108 | 5.8 | 0.22 | −49.8 |

TABLE 18

| | Treated magnetic particles | | |
|---|---|---|---|
| | Kind of magnetic particles | Coating weight of squaric acid, calcd. as C (wt %) | Coated weight of modified polysiloxane, calcd. as C (wt %) |
| Comp. Example 113 | Comp. Example 85 | — | — |
| Comp. Example 114 | Comp. Example 86 | — | — |
| Comp. Example 115 | Comp. Example 87 | — | — |
| Comp. Example 116 | Comp. Example 88 | — | — |
| Comp. Example 117 | Comp. Example 89 | — | 0.003 |
| Comp. Example 118 | Comp. Example 90 | — | 0.32 |
| Comp. Example 119 | Comp. Example 91 | — | 0.41 |
| Comp. Example 120 | Comp. Example 92 | — | 0.60 |
| Comp. Example 121 | Comp. Example 93 | — | 1.69 |
| Comp. Example 122 | Comp. Example 94 | — | 0.70 |
| Comp. Example 123 | Comp. Example 95 | — | 0.15 |
| Comp. Example 124 | Comp. Example 96 | — | 0.31 |
| Comp. Example 125 | Comp. Example 97 | 0.11 | — |
| Comp. Example 126 | Comp. Example 98 | | |

Properties of the coating using water-based paint
When using mill base prepared with dispersion time of 30 minutes

| | Hc (Oe) | RS (—) | Ra (μm) | RMS (μm) |
|---|---|---|---|---|
| Comp. Example 113 | 2716 | 0.80 | 0.55 | 0.66 |
| Comp. Example 114 | 1756 | 0.79 | 0.58 | 0.71 |
| Comp. Example 115 | 2532 | 0.76 | 0.48 | 0.58 |
| Comp. Example 116 | 331 | 0.72 | 0.49 | 0.58 |
| Comp. Example 117 | 348 | 0.68 | 0.80 | 1.02 |
| Comp. Example 118 | 2718 | 0.79 | 0.55 | 0.67 |
| Comp. Example 119 | 2732 | 0.80 | 0.56 | 0.68 |
| Comp. Example 120 | 2722 | 0.77 | 0.53 | 0.70 |
| Comp. Example 121 | 2715 | 0.80 | 0.55 | 0.66 |
| Comp. Example 122 | 2718 | 0.81 | 0.49 | 0.63 |
| Comp. Example 123 | 2710 | 0.81 | 0.52 | 0.64 |
| Comp. Example 124 | 2710 | 0.76 | 0.52 | 0.62 |
| Comp. Example 125 | 2731 | 0.77 | 0.56 | 0.67 |
| Comp. Example 126 | 2712 | 0.85 | 0.36 | 0.44 |

TABLE 18-continued

Properties of the coating using water-based paint
When using mill base prepared with dispersion time of 60 minutes

| | Hc (Oe) | RS (—) | Ra (μm) | RMS (μm) |
|---|---|---|---|---|
| Comp. Example 113 | 2723 | 0.81 | 0.48 | 0.58 |
| Comp. Example 114 | 1742 | 0.79 | 0.53 | 0.64 |
| Comp. Example 115 | 2526 | 0.77 | 0.46 | 0.55 |
| Comp. Example 116 | 333 | 0.72 | 0.42 | 0.50 |
| Comp. Example 117 | 356 | 0.70 | 0.53 | 0.64 |
| Comp. Example 118 | 2721 | 0.82 | 0.42 | 0.51 |
| Comp. Example 119 | 2730 | 0.83 | 0.45 | 0.56 |
| Comp. Example 120 | 2725 | 0.81 | 0.45 | 0.55 |
| Comp. Example 121 | 2720 | 0.80 | 0.48 | 0.58 |
| Comp. Example 122 | 2718 | 0.84 | 0.43 | 0.52 |
| Comp. Example 123 | 2712 | 0.81 | 0.45 | 0.58 |
| Comp. Example 124 | 2726 | 0.80 | 0.48 | 0.58 |
| Comp. Example 125 | 2726 | 0.79 | 0.44 | 0.53 |
| Comp. Example 126 | 2700 | 0.85 | 0.36 | 0.43 |

Properties of the coat using aqueous paint

| | Dispersion stability (Ra change rate after dilution) (%) | Storage stability (Ra during storage) (μm) | Zeta potential (mV) |
|---|---|---|---|
| Comp. Example 113 | 31.2 | 0.55 | −9.6 |
| Comp. Example 114 | 21.0 | 0.65 | −8.8 |
| Comp. Example 115 | 24.1 | 0.53 | −6.5 |
| Comp. Example 116 | 20.0 | 0.48 | −21.2 |
| Comp. Example 117 | 25.1 | 0.55 | −6.8 |
| Comp. Example 118 | 17.2 | 0.48 | −16.9 |
| Comp. Example 119 | 19.2 | 0.51 | −18.5 |
| Comp. Example 120 | 15.9 | 0.53 | −16.9 |
| Comp. Example 121 | 18.8 | 0.54 | −21.5 |
| Comp. Example 122 | 15.6 | 0.51 | −26.8 |
| Comp. Example 123 | 18.6 | 0.51 | −17.8 |
| Comp. Example 124 | 24.2 | 0.61 | −12.6 |
| Comp. Example 125 | 19.9 | 0.49 | −15.5 |
| Comp. Example 126 | 16.8 | 0.46 | −32.3 |

What is claimed is:

1. Modified particles comprising inorganic particles as core particles, squaric acid which is formed as a coating film on the surfaces of said core particles, and at least one polysiloxane modified with at least one organic group selected from the group consisting of polyethers, polyesters and aralkyls, which is formed as a coating layer on the coating film of squaric acid.

2. Modified particles according to claim 1, wherein said inorganic particles are inorganic colored particles or magnetic particles.

3. Modified particles according to claim 1, wherein the amount of squaric acid coated on the surfaces of said core particles is 0.01 to 10% by weight, calculated as C, based on the core particles, and the weight ratio of the coating amount of the modified polysiloxane to that of squaric acid is 1: 1,000 to 1,000:1.

4. Modified particles according to claim 2, wherein said inorganic colored particles are particles of a pigment selected from the group consisting of white pigment, black pigment, yellow pigment, orange pigment, brown pigment, red pigment, violet pigment, blue pigment and green pigment.

5. Modified particles according to claim 2, wherein said magnetic particles are magnetoplumbite ferrite particles and magnetic iron oxide particles.

6. A pigment comprising the modified particles set forth in claim 4.

7. A water-based paint comprising a paint base material and the modified particles as the pigment set forth in claim 4 blended therein.

8. A water-based paint according to claim 7, wherein the amount of said pigment is 0.1 to 200 parts by weight based on 100 parts by weight of the paint base material.

9. Magnetic particles comprising the modified particles set forth in claim 5.

10. A magnetic water-based paint comprising a paint base material and the modified particles as the magnetic particles set forth in claim 5 blended therein.

11. A magnetic water-based paint according to claim 10, wherein the amount of said magnetic particles is 0.1 to 200 parts by weight based on 100 parts by weight of the paint base material.

12. A magnetic recording sheet comprising a non-magnetic support and a magnetic layer formed by applying the water-based paint set forth in claim 10 on at least a part of said support and at least one side of said support, the surface roughness of said magnetic layer being not more than 0.35 μm and the squareness of said magnetic layer being not less than 0.87.

13. A process for producing modified particles set forth in claim 1, which comprises adding squaric acid to an aqueous suspension containing the inorganic particles, followed by filtering and drying to coat the particle surfaces with squaric acid, and then mixing, at not less than 80° C., said squaric acid-coated inorganic particles and at least one polysiloxane modified with at least one selected from the group consisting of polyethers, polyesters and aralkyls to overlay said squaric acid-coated particle surfaces with said polysiloxane.

14. Modified particles consisting essentially of inorganic particles as core particles having a particle size of 0.01 to 20 μm, and polyether-modified polysiloxanes represented by the formula (I):

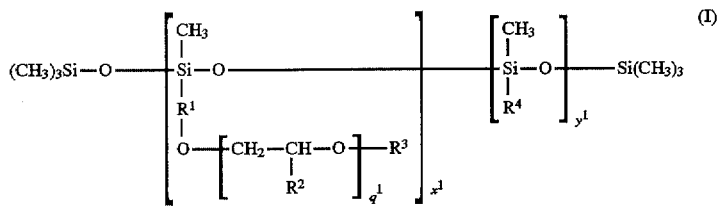

(I)

wherein $R^1$ represents $-(CH_2)_{l^1}-$ wherein $l^1$ is a number of 1 to 15; $R^2$ represents $-(CH_2)_{m^1}-CH_3$ wherein $m^1$ is a number of 0 to 15; $R^3$ represents H, OH, COOH, NCO, $NH_2$, $-CH=CH_2$, $-C(CH_3)=CH_2$ or $-(CH_2)_{n^1}-CH_3$ wherein $n^1$ is a number of 0 to 15; $R^4$ represents H or $-(CH_2)_{p^1}-CH_3$ wherein $p^1$ is a number of 0 to 15; $q^1$ is a number of 1 to 15; $x^1$ is a number of 1 to 50; and $y^1$ is a number of 1 to 300 which polysiloxane (I) is coated on the surfaces of said core particles.

15. Modified particles according to claim 14, wherein the number-average molecular weight of the polyether-modified polysiloxanes are represented by the formula (I) is 350 to 500,000.

16. Modified particles according to claim 14, wherein said inorganic particles are inorganic colored particles or magnetic particles.

17. Modified particles according to claim 16, wherein said inorganic colored particles are particles of a pigment selected from the group consisting of white pigment, black pigment, yellow pigment, orange pigment, brown pigment, red pigment, violet pigment, blue pigment and green pigment.

18. Modified particles according to claim 17, wherein said inorganic colored particles are red iron oxide particles.

19. Modified particles according to claim 16, wherein said magnetic particles are magnetoplumbite ferrite particles and magnetic iron oxide particles.

20. Modified particles according to claim 14, wherein the amount of the modified polysiloxane coated on the surfaces of said core particles is 0.01 to 10% by weight, calculated as C, based on the core particles.

21. Modified particles consisting essentially of inorganic particles as core particles having a particle size of 0.01 to 20 μm, and polyester-modified polysiloxanes represented by the following formula (II):

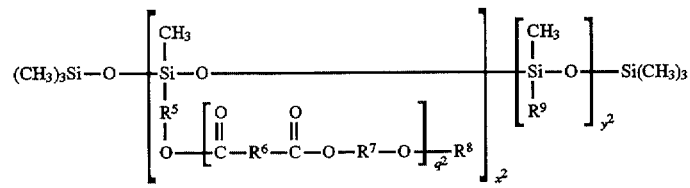

(II)

wherein $R^5$ represents $(CH_2)_{l^2}-$ wherein $l^2$ is a number of 1 to 15; $R^6$ and $R^7$ represent $-(CH_2)_{m^2}-$ or

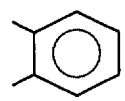

and maybe the same or different wherein $m^2$ is a number of 1 to 15; $R^8$ represents H, OH, COOH, NCO, $NH_2$, $-CH=CH_2$, $-C(CH_3)=CH_2$ or $-(CH_2)_{n^2}-CH_3$ wherein $n^2$ is a number of 0 to 15; $R^9$ represents H or $-(CH_2)_{p^2}-$ $CH_3$ wherein $p^2$ is a number of 0 to 15; $q^2$ is a number of 1 to 15; $x^2$ is a number of 1 to 50; and $y^2$ is a number of 1 to 300 which polysiloxane (II) is coated on the surfaces of said core particles.

22. Modified particles according to claim 21, wherein the number-average molecular weight of the polyester-modified polysiloxanes represented by the formula (II) is 400 to 500,000.

23. Modified particles according to claim 21 wherein said inorganic particles are inorganic colored particles or magnetic particles.

24. Modified particles according to claim 23, wherein said inorganic colored particles are particles of a pigment selected from the group consisting of white pigment, black pigment, yellow pigment, orange pigment, brown pigment, red pigment, violet pigment, blue pigment and green pigment.

25. Modified particles according to claim 24, wherein said inorganic colored particles are red iron oxide particles.

26. Modified particles according to claim 23, wherein said magnetic particles are magnetoplumbite ferrite particles and magnetic iron oxide particles.

27. Modified particles according to claim 21, wherein the amount of the modified polysiloxane coated on the surfaces of said core particles is 0.01 to 10% by weight, calculated as C, based on the core particles.

28. Modified particles consisting essentially of inorganic particles as core particles having a particle size of 0.01 to 20 μm, and aralkyl-modified polysiloxanes represented by the following formula (III):

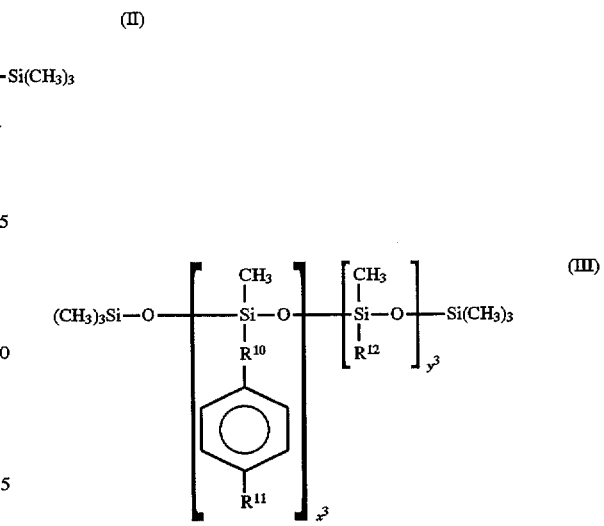

(III)

wherein $R^5$ represents $-(CH_2)_{l^2}-$ wherein $l^2$ is a number of 1 to 15; $R^6$ and $R^7$ represent $-(CH_2)_{m^2}-$ or

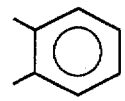

and may be the same or different wherein $m^2$ is a number of 1 to 15; $R^8$ represents H, OH, COOH, NCO, $NH_2$, $-CH=CH_2$, $-C(CH_3)=CH_2$ or $-(CH_2)_{n^2}-CH_3$ wherein $n^2$ is a number of 0 to 15; $R^9$ represents H or $-(CH_2)_{p^2}-CH_3$ wherein $p^2$ is a number of 0 to 15; $q^2$ is a number of 1 to 15; $x^2$ is number of 1 to 50; and $y^2$ is a number of 1 to 300; and aralkyl-modified polysiloxanes represented by the following formula (III):

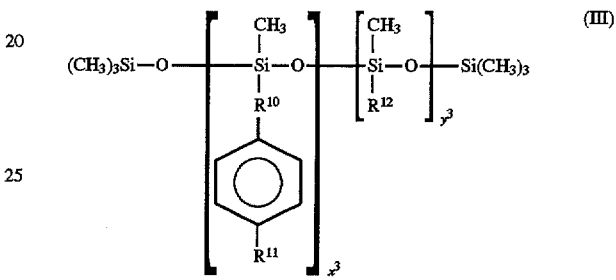

wherein $R^{10}$ represents $-(CH_2)_{l^3}-$ wherein $l^3$ is a number of 1 to 15; $R^{11}$ represents H, OH, COOH, NCO, $NH_2$, $-CH=CH_2$, $-C(CH_3)=CH_2$ or $-(CH_2)_{m^3}-CH_3$ wherein $m^3$ is a number of 0 to 15; $R^{12}$ represents H or $-(CH_2)_{n^3}-CH_3$ wherein $n^3$ is a number of 0 to 15; $x^3$ is a number of 1 to 500; and $y^3$ is a number of 1 to 500, which is coated on the surfaces of said core particles.

29. Modified particles according to claim 28, wherein the number-average molecular weight of the aralkyl-modified polysiloxanes represented by the formula (III) is 350 to 500,000.

30. Modified particles according to claim 28, wherein said inorganic particles are inorganic colored particles or magnetic particles.

31. Modified particles according to claim 30, wherein said inorganic colored particles are particles of a pigment selected from the group consisting of white pigment, black pigment, yellow pigment, orange pigment, brown pigment, red pigment, violet pigment, blue pigment and green pigment.

32. Modified particles according to claim 31, wherein said inorganic colored particles are red iron oxide particles.

33. Modified particles according to claim 30, wherein said magnetic particles are magnetoplumbite ferrite particles and magnetic iron oxide particles.

34. Modified particles according to claim 28, wherein the amount of the modified polysiloxane coated on the surfaces of said core particles is 0.01 to 10% by weight, calculated as C, based on the core particles.

35. Modified particles consisting essentially of inorganic particles as core particles having a particle size of 0.01 to 20 µm, and at least one selected from the group consisting of:

polyether-modified polysiloxanes represented by the following formula (I):

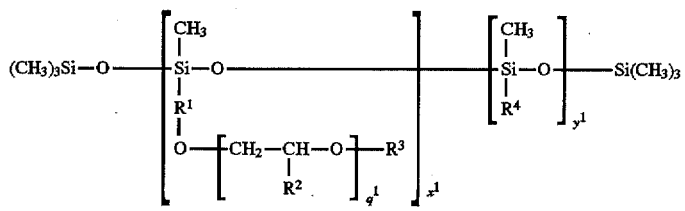

wherein $R^1$ represents $-(CH_2)_{l^1}-$ where $l^1$ is a number of 1 to 15; $R^2$ represents $-(CH_2)_{m^1}-CH_3$ wherein $m^1$ is a number of 0 to 15; $R^3$ represents H, OH, COOH, NCO, $NH_2$, $-CH=CH_2$, $-C(CH_3)=CH_2$ or $-(CH_2)_{n^1}-CH_3$ wherein $n^1$ is a number of 0 to 15; $R^4$ represents H or $-(CH_2)_{p^1}-CH_3$ wherein $p^1$ is a number of 0 to 15; $q^1$ is a number of 1 to 15; $x^1$ is a number of 1 to 50; and $y^1$ is a number of 1 to 300;

polyester-modified polysiloxanes represented by the following formula (II):

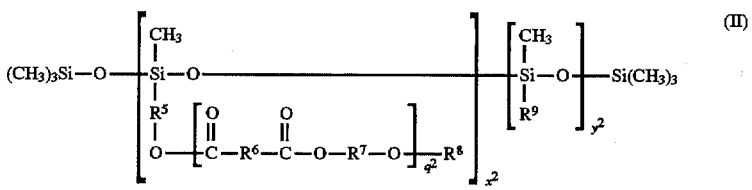

number of 0 to 15; $x^3$ is a number of 1 to 500; and $y^3$ is a number of 1 to 500, which is coated on the surfaces of said core particles.

36. Modified particles according to claim 35, wherein the number-average molecular weight of the polyether modified polysiloxanes represented by the formula (I) is 350 to 500,000.

37. Modified particles according to claim 35, wherein the number-average molecular weight of the polyester modified polysiloxanes represented by the formula (II) is 400 to 500,000.

38. Modified particles according to claim 35, wherein the number-average molecular weight of the aralkyl-modified polysiloxanes represented by the formula (III) is 350 to 500.000.

39. A pigment comprising the modified particles set forth in claim 17, 26 or 31.

40. A water-based paint comprising a paint base material and the modified particles as the pigment set forth in claim 17, 24 or 31 blended therein.

41. A water-based paint according to claim 40, wherein the amount of said pigment is 0.1 to 200 parts by weight based on 100 parts by weight of the paint base material.

42. Magnetic particles comprising the modified particles set forth in claim 17, 26 or 33.

43. A magnetic water-based paint comprising a paint base material and the modified particles as the magnetic particles set forth in claim 19, 26 or 33 blended therein.

44. A magnetic water-based paint according to claim 43, wherein the amount of said magnetic particles is 0.1 to 200 parts by weight based on 100 parts by weight of the paint base material.

45. A magnetic recording sheet comprising a non-magnetic support and a magnetic layer formed by applying the water-based paint set forth in claim 43 on at least a part of said support and at least one side of said support, the surface roughness of said magnetic layer being not more than 0.35 μm and the squareness of said magnetic layer being not less than 0.87.

46. A process for producing modified particles set forth in claim 14, 21 or 28, which comprises mixing, at not less than 80° C., inorganic particles and at least one polysiloxane modified with at least one organic group selected from the group consisting of polyethers, polyesters and aralkyls to coat the surfaces of said particles with said modified polysiloxane.

* * * * *